US012453925B2

(12) United States Patent
Fukada et al.

(10) Patent No.: US 12,453,925 B2
(45) Date of Patent: Oct. 28, 2025

(54) SYSTEMS AND METHODS OF CONTROLLING OBJECTS IN A VIRTUAL SPACE BASED ON POSTURE OF ANOTHER OBJECT

(71) Applicant: Nintendo Co., Ltd., Kyoto (JP)

(72) Inventors: Naoki Fukada, Kyoto (JP); Takafumi Okawa, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 352 days.

(21) Appl. No.: 18/126,835

(22) Filed: Mar. 27, 2023

(65) Prior Publication Data

US 2024/0157233 A1 May 16, 2024

(30) Foreign Application Priority Data

Nov. 10, 2022 (JP) ................................ 2022-180222

(51) Int. Cl.
*A63F 13/42* (2014.01)
*A63F 13/52* (2014.01)
*A63F 13/57* (2014.01)

(52) U.S. Cl.
CPC .............. *A63F 13/42* (2014.09); *A63F 13/52* (2014.09); *A63F 13/57* (2014.09)

(58) Field of Classification Search
CPC .......... A63F 13/55; A63F 13/56; A63F 13/57; A63F 13/573; A63F 13/577; A63F 13/822
See application file for complete search history.

(56) References Cited

U.S. PATENT DOCUMENTS

2018/0059788 A1 3/2018 Noguchi et al.

FOREIGN PATENT DOCUMENTS

JP 2018-032133 3/2018
JP 2019-010338 1/2019
JP 2021-159405 10/2021

OTHER PUBLICATIONS

"Captain Toad Treasure Tracker". From Wikipedia. [online], [retrieved on May 9, 2025]. Retrieved from the Internet <URL:https://en.wikipedia.org/w/index.php?title=Captain_Toad:_Treasure_Tracker&oldid=1110756260>. 14 pages. (Year: 2022).*

"2-10 Spinwheel Cog Ruins Captain Toad ", [year 2018]. [online], [retrieved May 9, 2025]. Retrieved from the Internet < URL:https://www.youtube.com/watch?v=hnBce-OWMG4>. 1 page.*

Mar. 1, 2024 Office Action issued in Japanese Patent Application No. 2022-180222, pp. 1-4 [machine translation included].

(Continued)

*Primary Examiner* — Lawrence S Galka
(74) *Attorney, Agent, or Firm* — Nixon & Vanderhye P.C.

(57) ABSTRACT

A game program according to the present exemplary embodiment causes the computer to perform a first control including at least a movement for a player character in a virtual space according to an operation input based on a first operation, according to an operation input based on a second operation, perform a second control for an operation target that is an operable object out of a plurality of operable objects; and rotate a terrain object, according to a change in a posture of a first object that is the operable object.

24 Claims, 18 Drawing Sheets

(56) References Cited

OTHER PUBLICATIONS

[2-10 Kurukuru Haguruma Ruins: 3 diamonds, theme cleared, Dot Toad] Strategy, Proceed! Captain Toad "2-10 Spinwheel Cog Ruins" Captain Toad, Youtube [Video] [online], Aug. 24, 2018, Internet: <URL: https://www.youtube.com/watch?v=hnBce-OWMG4> [Seached on Feb. 26, 2024] pp. 1-11.

An escape game with a mysterious atmosphere in which Alice is guided by rotating the world with a mysterious clock, "Alice and the Woderful House", BoomAppGames, Jan. 24, 2015, Internet: <URL: https://game.boom-app.com/entry/Alice-wonder-house-review> [Searched on Feb. 26, 2024] pp. 1-4.

☆39 [Temple at the Bottom of the Lake] A gentle live play of The Legend of Zelda Twilight Princess HD! , Youtube [Video] [online], Oct. 14, 2016, Internet: URL:https://www.youtube.com/watch?v= 1H2UAJQHFk [Searched on Feb. 26, 2024] pp. 1-7.

[Strategies] Fly away and run wild! 15 selections of the unexpected method of riding a raft [The Legend of Zelda: Breath of the Wild], Youtube [Video] [online], May 27, 2022, Internet: <URL:https://www.youtube.com/watch?v=eGnhelbTaf8> [Searched on Feb. 26, 2024] pp. 1-7.

"The Legend of Zelda: Breath of the Wild", [online] , 2022, Nintendo Co., Ltd., [searched on Nov. 4, 2022], internet, <URL:https://www.zelda.com/breath-of-the-wild/> (4 pages).

* cited by examiner

SYSTEMS AND METHODS OF CONTROLLING OBJECTS IN A VIRTUAL SPACE BASED ON POSTURE OF ANOTHER OBJECT

CROSS REFERENCE TO RELATED APPLICATION

This application claims priority to Japanese Patent Application No. 2022-180222 filed on Nov. 10, 2022, the entire contents of which are incorporated herein by reference.

FIELD

An exemplary embodiment relates to a non-transitory computer-readable storage medium having stored a game program, an information processing apparatus, an information processing system, and an information processing method.

BACKGROUND AND SUMMARY

Traditionally, there have been games that move a player character over a terrain object in a virtual space.

There have been games allowing operations to have the player character move a predetermined object. On the other hand, terrain objects could be moved based on player operation, but this was done in a special operating scene. In other words, it was necessary to prepare a special operating scene.

Therefore, an object of the present exemplary embodiment is to provide a game program, an information processing apparatus, an information processing system, and an information processing method each of which uses a system, in which a player character is moved according to a player operation, for also moving terrain objects, thereby enabling control of terrain with a simple configuration.

To achieve the above-described object, this exemplary embodiment adopts a configuration as described below.

First Configuration

A game program according to a first configuration causes a computer of an information processing apparatus to perform a first control of a player character in a virtual space according to an operation input based on a first operation. The first control includes at least a movement of the player character on a terrain object in the virtual space. Further, the game program causes the computer to, according to an operation input based on a second operation, perform a second control for an operation target that is an operable object out of a plurality of operable objects to be a target of the second operation among a plurality of objects within the virtual space. The second control includes at least rotation of the operation target in the virtual space. The game program then causes the computer to rotate a second object that is the terrain object, according to a change in a posture of a first object that is the operable object, within the virtual space.

According to the above, a second control is performed according to an operation input based on a second operation, for an operation target that is any of a plurality of operable objects, and a terrain object can be rotated, according to a change in a posture of a first object that is the operable object. This allows the player to rotate the terrain object in the virtual space by rotating the first object as the operation target.

Second Configuration

A second configuration may be the above-described first configuration such that the game program causes the computer to perform, as the second control, at least a control of rotating an object set as the operation target about a predetermined axis and a control of moving the object set as the operation target in an instructed direction.

According to the above, an object that is the operation target can be rotated or moved according to the operation input based on the second operation.

Third Configuration

A third configuration may be the second configuration adapted so that the game program causes the computer to perform, further as the second control, a control of coupling the object set as the operation target with another object.

According to the above, an object that is the operation target can be coupled with another object according to the operation input based on the second operation.

Fourth Configuration

A fourth configuration may be the third configuration adapted so that the operable object includes a thrust object that generates virtual thrust. The game program further causes the computer to: cause at least one object out of the operable objects to make a motion based on the virtual thrust, while the second control is not performed; and when the thrust object is coupled with the first object, cause the first object coupled with the thrust object to make a motion based on the virtual thrust given by the thrust object.

According to the above, by coupling the thrust object with the first object, the first object can make a motion. This allows the terrain object to rotate when the first object is rotated.

Fifth Configuration

A fifth configuration may be the third or fourth configuration adapted so that the game program further causes the computer to: cause at least one object out of the operable objects to make a motion under an effect of virtual gravity, while the second control is not performed; and when a third object that is an operable object different from the first object is coupled with the first object, cause the first object coupled with the third object to make a motion under the effect of the virtual gravity.

According to the above, by coupling a third object with the first object, the first object can make a motion based on the gravity affecting the third object. This allows the terrain object to rotate when the first object is rotated.

Sixth Configuration

A sixth configuration may be the fifth configuration adapted so that the first object is maintained in a state of floating in the air in the virtual space irrespective of the virtual gravity.

According to the above, since the first object is floating in the air, the player can easily rotate the first object by the second operation while confirming the posture of the first object.

Seventh Configuration

A seventh configuration may be the sixth configuration adapted so that a position of the first object is fixed within the virtual space or a movement range of the first object is restricted within the virtual space.

According to the above, the first object can be fixed in the virtual space or restrict the movement range of the first object to control the posture of the first object.

Eighth Configuration

An eighth configuration may be any of the above first to seventh configurations adapted so that the game program further causes the computer to: cause at least one object out of the operable objects to make a motion under an effect of virtual gravity, while the second control is not performed. The first object is maintained in a state of floating in the air in the virtual space irrespective of the virtual gravity.

According to the above, since the first object is floating in the air, the player can easily rotate the first object by the second operation while confirming the posture of the first object.

Ninth Configuration

A ninth configuration may be the eighth configuration adapted so that the game program further causes the computer to: cause the player character to fall based on virtual gravity and, cause the first object to make a motion based on the virtual gravity affecting the player character while the player character is on the first object.

According to the above, the first object can make a motion based on the gravity affecting the player character, while the player character is on the first object, and with rotation of the first object, the terrain object can be rotated.

Tenth Configuration

A tenth configuration may be any of the above first to ninth configurations adapted so that the game program further causes the computer to: restrict the second control for the first object while the player character is on the second object.

According to the above, the second control for the first object can be restricted while the player character is on the first object. This way, for example, it is possible to avoid a situation where the player character falls from the first object.

Eleventh Configuration

An eleventh configuration may be any of the above first to tenth configurations adapted so that the game program further causes the computer to: as the second control, rotate the second object at a predetermined rotational speed so that a rotational direction and a rotational amount of the posture of the second object relative to its reference posture approach to a rotational direction and a rotational amount of the posture of the first object relative to its reference posture.

According to the above, the posture of the terrain object can be brought closer to the posture of the first object by rotating the terrain object at a predetermined rotational speed.

Further, other configurations may be an information processing apparatus that executes the above-described game program, an information processing system, or an information processing method performed in an information processing system.

According to the exemplary embodiment, the terrain object can be rotated in the virtual space by rotating the first object as the operation target.

These and other objects, features, aspects and advantages will become more apparent from the following detailed description when taken in conjunction with the accompanying drawings.

DETAILED DESCRIPTION OF NON-LIMITING EXAMPLE EMBODIMENTS (Game System Configuration)

Figure 1:
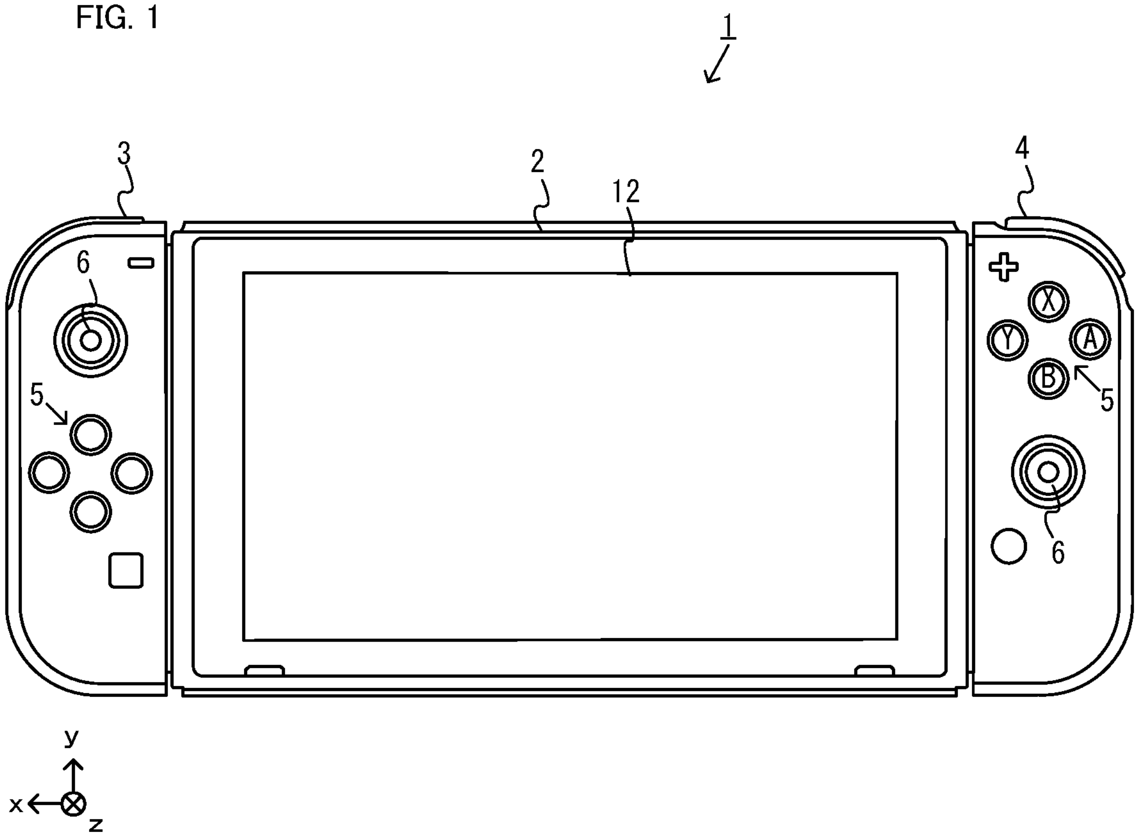
FIG. 1 is an example non-limiting diagram of a game system.

A game system according to an example of an exemplary embodiment is described below. FIG. 1 is a diagram showing an exemplary game system. An example of a game system 1 according to the exemplary embodiment includes a main body apparatus (an information processing apparatus; which functions as a game apparatus main body in the exemplary embodiment) 2, a left controller 3, and a right controller 4. The main body apparatus 2 is an apparatus for performing various processes (e.g., game processing) in the game system 1. The left controller 3 and the right controller 4 each include a plurality of buttons 5 (A-button, B-button, X-button, Y-button) and an analog stick 6, as exemplary operation units through which a user performs input.

Each of the left controller 3 and the right controller 4 is attachable to and detachable from the main body apparatus 2. That is, the game system 1 can be used as a unified apparatus obtained by attaching each of the left controller 3 and the right controller 4 to the main body apparatus 2, or the main body apparatus 2, the left controller 3, and the right controller 4 may be separated from one another, when being used. It should be noted that hereinafter, the left controller 3 and the right controller 4 will occasionally be referred to collectively as a "controller".

Figure 2:
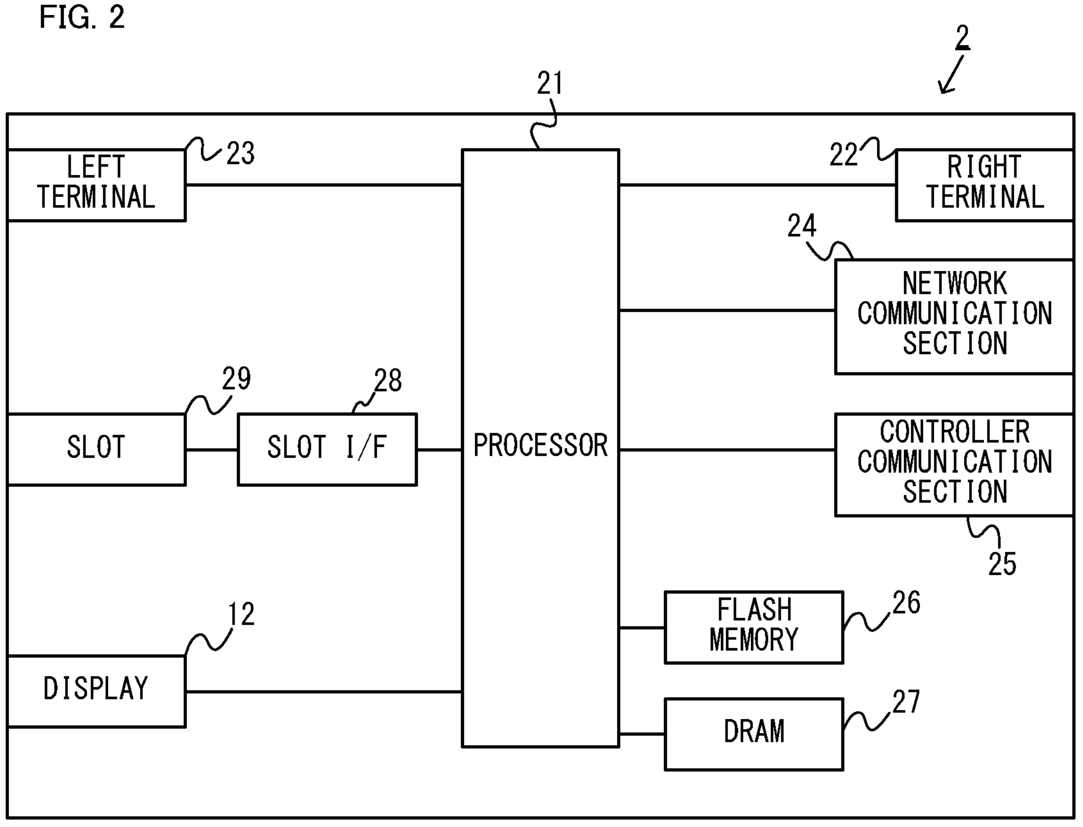
FIG. 2 is an example non-limiting block diagram showing an exemplary internal configuration of the main body apparatus 2.

FIG. 2 is a block diagram showing an example of the internal configuration of the main body apparatus 2. As shown in FIG. 2, the main body apparatus 2 includes a processor 21. The processor 21 is an information processing section for executing various types of information processing (e.g., game processing) to be executed by the main body apparatus 2, and for example, includes a CPU (Central Processing Unit) and a GPU (Graphics Processing Unit). Note that the processor 21 may be configured only by a CPU, or may be configured by a SoC (System-on-a-Chip) that includes a plurality of functions such as a CPU function and a GPU function. The processor 21 executes an information processing program (e.g., a game program) stored in a storage section (specifically, an internal storage medium such as a flash memory 26, an external storage medium attached to the slot 29, or the like), thereby performing the various types of information processing.

Further, the main body apparatus 2 also includes a display 12. The display 12 displays an image generated by the main body apparatus 2. In the exemplary embodiment, the display 12 is a liquid crystal display device (LCD). The display 12, however, may be a display device of any type. The display 12 is connected to the processor 21. The processor 21 displays a generated image (e.g., an image generated by executing the above information processing) and/or an externally acquired image on the display 12.

Further, the main body apparatus 2 includes a left terminal 23, which is a terminal for the main body apparatus 2 to perform wired communication with the left controller 3, and a right terminal 22, which is a terminal for the main body apparatus 2 to perform wired communication with the right controller 4.

Further, the main body apparatus 2 includes a flash memory 26 and a DRAM (Dynamic Random Access Memory) 27 as examples of internal storage media built into the main body apparatus 2. The flash memory 26 and the DRAM 27 are connected to the processor 21. The flash memory 26 is a memory mainly used to store various data (or programs) to be saved in the main body apparatus 2. The DRAM 27 is a memory used to temporarily store various data used for information processing.

The main body apparatus 2 includes a slot 29. The slot 29 is so shaped as to allow a predetermined type of storage medium to be attached to the slot 29. The predetermined type of storage medium is, for example, a dedicated storage medium (e.g., a dedicated memory card) for the game system 1 and an information processing apparatus of the same type as the game system 1. The predetermined type of storage medium is used to store, for example, data (e.g., saved data of a game application or the like) used by the main body apparatus 2 and/or a program (e.g., a game program or the like) executed by the main body apparatus 2.

The main body apparatus 2 includes a slot interface (hereinafter abbreviated as "I/F") 28. The slot I/F 28 is connected to the processor 21. The slot I/F 28 is connected to the slot 29, and in accordance with an instruction from the processor 21, reads and writes data from and to the predetermined type of storage medium (e.g., a dedicated memory card) attached to the slot 29.

The processor 21 appropriately reads and writes data from and to the flash memory 26, the DRAM 27, and each of the above storage media, thereby performing the above information processing.

The main body apparatus 2 includes a network communication section 24. The network communication section 24 is connected to the processor 21. The network communication section 24 performs wired or wireless communication with an external apparatus via a network. In the exemplary embodiment, as a first communication form, the network communication section 24 connects to a wireless LAN and communicates with an external apparatus, using a method compliant with the Wi-Fi standard. Further, as a second communication form, the network communication section 24 wirelessly communicates with another main body apparatus 2 of the same type, using a predetermined communication method (e.g., communication based on a unique protocol or infrared light communication). It should be noted that the wireless communication in the above second communication form achieves the function of enabling so-called "local communication" in which the main body apparatus 2 can wirelessly communicate with another main body apparatus 2 placed in a closed local network area, and the plurality of main body apparatuses 2 directly communicate with each other to transmit and receive data.

The main body apparatus 2 includes a controller communication section 25. The controller communication section 25 is connected to the processor 21. The controller communication section 25 wirelessly communicates with the left controller 3 and/or the right controller 4. The communication method between the main body apparatus 2 and the left controller 3 and the right controller 4 is optional. In the exemplary embodiment, the controller communication section 25 performs communication compliant with the Bluetooth (registered trademark) standard with the left controller 3 and with the right controller 4.

The processor 21 is connected to the left terminal 23 and the right terminal 22. When performing wired communication with the left controller 3, the processor 21 transmits data to the left controller 3 via the left terminal 23 and also receives operation data from the left controller 3 via the left terminal 23. Further, when performing wired communication with the right controller 4, the processor 21 transmits data to the right controller 4 via the right terminal 22 and also receives operation data from the right controller 4 via the right terminal 22. As described above, in the exemplary embodiment, the main body apparatus 2 can perform both wired communication and wireless communication with each of the left controller 3 and the right controller 4.

It should be noted that, in addition to the elements shown in FIG. 2, the main body apparatus 2 includes a battery that supplies power and an output terminal for outputting images and audio to a display device (e.g., a television) separate from the display 12.

Overview of Game

Figure 3:
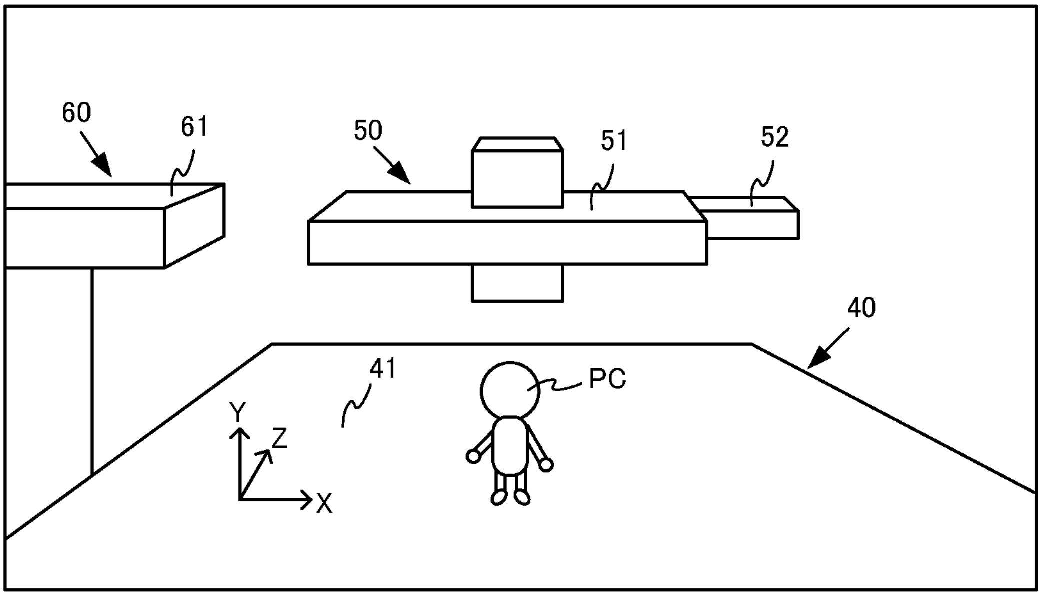
FIG. 3 is an example non-limiting diagram showing an exemplary game image displayed in a case where a game of an exemplary embodiment is executed.

The following describes a game of this exemplary embodiment. FIG. 3 is a diagram showing an exemplary game image displayed when a game of this exemplary embodiment is executed. As shown in FIG. 3, a player character PC is arranged in a virtual space (game space). In the virtual space, a vertically upward Y-axis and an X-axis, and a Z-axis perpendicular to the Y-axis are set.

A plurality of terrain objects 40, 50, 60 on which the player character PC can move are arranged in the virtual space. On a ground 41 of the terrain object 40, the player character PC is arranged. The ground 41 is, for example, a plane parallel to a XZ plane of the virtual space. In front of the player character PC, the terrain object 50 is arranged. Further, on the left side of the terrain object 50, another terrain object 60 is arranged. The terrain object 50 is floating in the virtual space. In the virtual space, virtual gravity works downward (in the negative Y-axis direction), but not for the terrain object 50 (or virtual buoyancy works on the terrain object 50 in the direction opposite to the virtual gravity). Accordingly, the terrain object 50 remains floating in the air.

The player character PC moves in the virtual space, jumps in the virtual space, and makes a predetermined action in the virtual space, in response to an operation input based on a first operation by the player. For example, the player character PC moves on the terrain object 40 in response to a directional input to the analog stick 6 of the left controller 3. The player character PC has an ability to operate any of operable objects (hereinafter referred to as the "special ability") in response to an operation input based on a second operation by the player.

The operable objects are each an object operated by the special ability of the player character PC and are arranged on the terrain object. The operable objects are detailed later. In addition to the operable objects, various objects (e.g., enemy characters, tree objects fixed in the virtual space, or the like) that are not operated by the special ability of the player character PC are placed on the terrain objects, although these objects are not shown in the figure.

The terrain objects 40, 50, and 60 are spaced from one another. Since the terrain object 40 and the terrain object 50 are relatively far apart, the player character PC cannot move from the terrain object 40 onto the terrain object 50 in the state shown in FIG. 3. Further, since the terrain object 40 and the terrain object 60 are relatively far apart, the player character PC cannot move from the terrain object 40 onto the terrain object 60. Further, since the terrain object 50 and the terrain object 60 are relatively far apart, the player character PC cannot move from the terrain object 50 to the terrain object 60, even if the player character PC is temporarily positioned on the terrain object 50.

Here, the terrain objects 40 and 60 are fixed in a predetermined position of the virtual space, in a predetermined posture. On the other hand, the terrain object 50 is configured to be capable of changing at least a posture within the virtual space.

Figure 4:
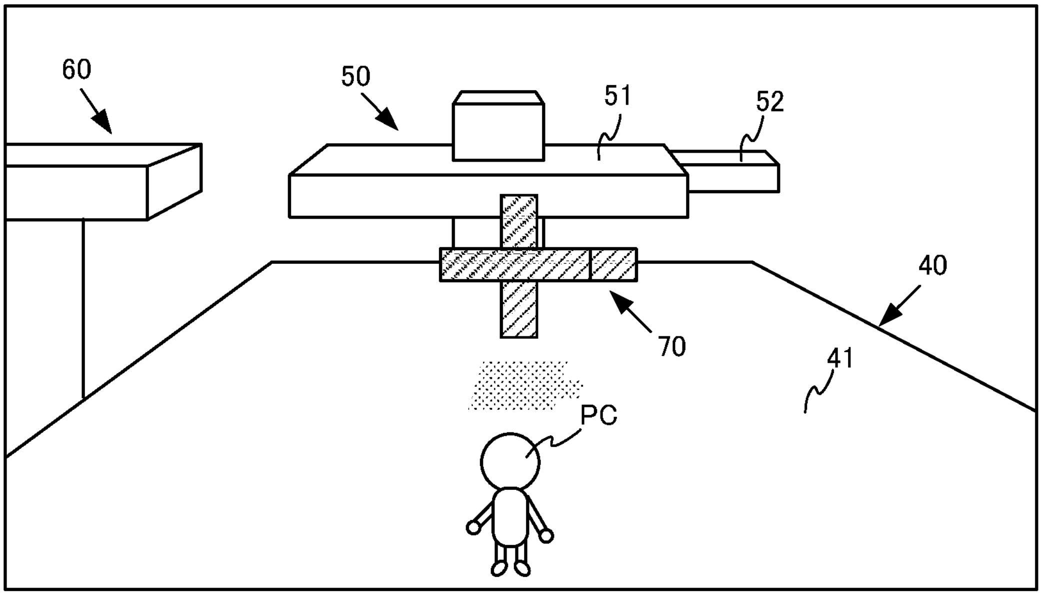
FIG. 4 is an example non-limiting diagram showing an exemplary game image including a first object.

In the game of the present exemplary embodiment, a first object is arranged to control at least the posture of the terrain object 50. FIG. 4 is a diagram showing an exemplary game image including the first object.

As shown in FIG. 4, a first object 70 is arranged in the virtual space. The first object 70 is an exemplary operable object that is controlled in response to an operation input based on the second operation by the player.

The first object 70 is arranged at a predetermined distance apart from the ground 41 of the terrain object 40. Since the virtual gravity does not affect the first object 70 (or virtual buoyancy works on the first object 70 in the direction opposite to gravity), the first object 70 remains floating in the air.

The first object 70 is an object for controlling the terrain object 50. The first object 70 may be identical or similar in shape to the terrain object 50. The posture of the terrain object 50 changes with a change in the posture of the first object 70. The player controls at least the posture of the first object using the special ability of the player character PC.

Figure 5:
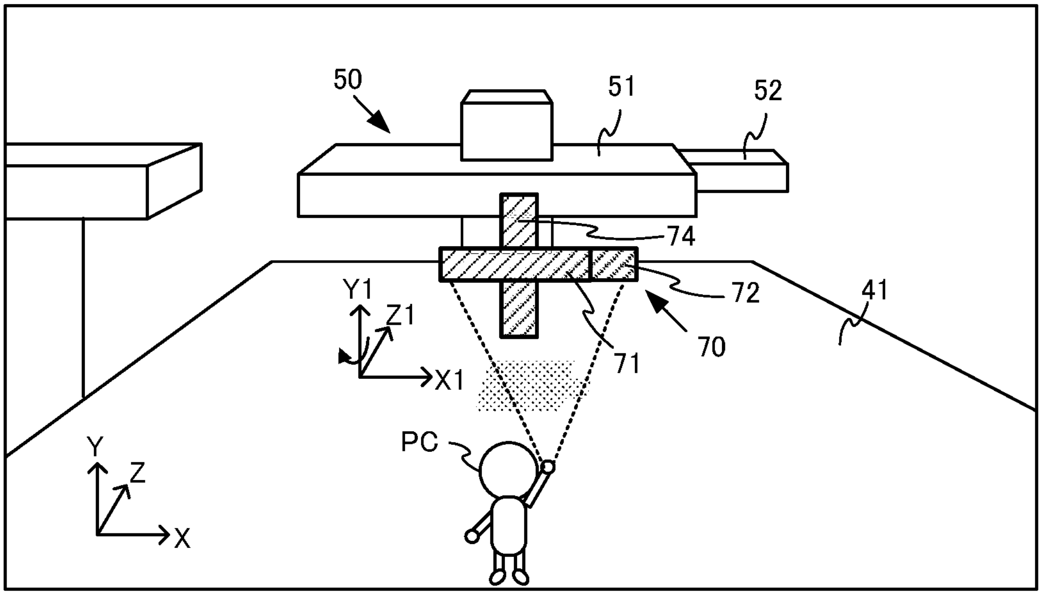
FIG. 5 is an example non-limiting diagram showing an exemplary game image when a first object 70 is operated using a special ability of a player character PC.
Figure 6:
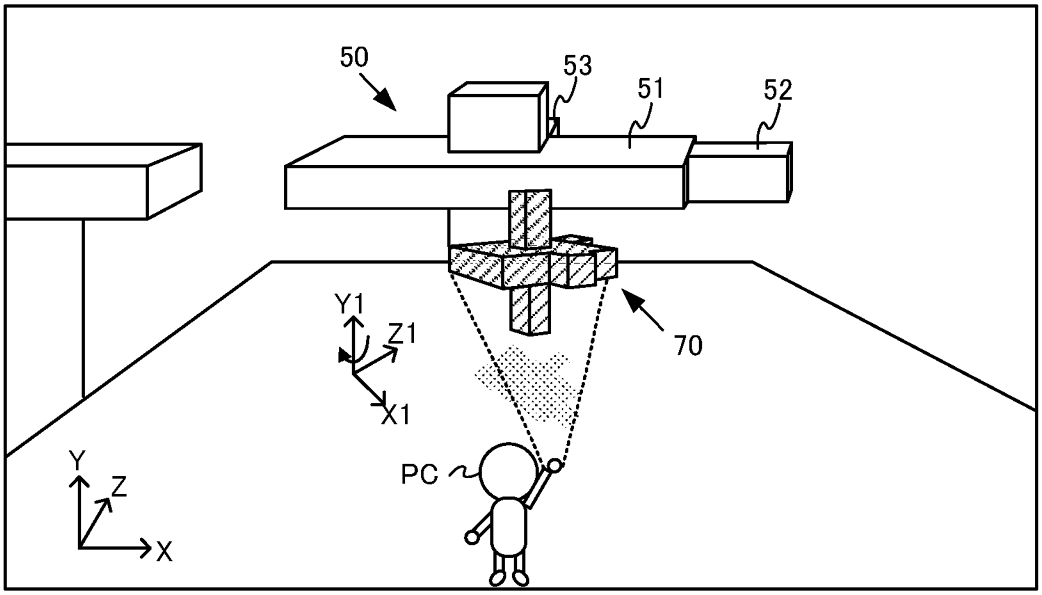
FIG. 6 is an example non-limiting diagram showing an exemplary game image when a predetermined rotation operation is performed during the state shown in FIG. 5.

FIG. 5 is a diagram showing an exemplary game image when the first object 70 is operated using a special ability of the player character PC. FIG. 6 is a diagram showing an exemplary game image when a predetermined rotation operation is performed during the state shown in FIG. 5.

For example, the player character PC acquires the special ability to operate the operable objects in the virtual space by obtaining a predetermined item during the game, defeating a predetermined enemy character, or talking to a predetermined game character. Alternatively, the player character PC may initially have the special ability.

As shown in FIG. 5, based on a selection operation by the player, the first object 70 is selected, from the plurality of operable objects in the virtual space, as the operation target to be operated. For example, when a predetermined selection button is pressed while the first object 70 is positioned in front of the player character PC, the first object 70 is selected as the operation target. When the first object 70 is selected as the operation target, a beam is emitted from a hand of the player character PC and the first object 70 is emphasized in the display.

The first object 70 is initially arranged in a predetermined posture, in a predetermined position in the Y-axis direction from the ground 41 that is the top surface of the terrain object 40. The initial position of the first object 70 is referred to here as the "reference position" and the initial posture of the first object 70 as the "reference posture". The X1-Y1-Z1 coordinate system shown in FIG. 5 is a coordinate system fixed to the first object 70. The first object 70 has a first part 71, a second part 72, and a fourth part 74. The fourth part 74 of the first object 70 is formed to extend in a Y1-axis direction from an upper surface of the first part 71, and the second part 72 of the first object 70 is formed to extend in an X1-axis direction from a right side of the first part 71.

When the player performs a predetermined rotation operation during this state, the first object 70 rotates about the Y-axis, as shown in FIG. 6. The terrain object 50 rotates with the rotation of the first object 70. Specifically, the terrain object 50 is initially arranged in the reference posture in the virtual space, and the terrain object 50 changes its posture from the reference posture with a change in the posture of the first object 70 from its reference posture. For example, when the first object 70 rotates counterclockwise about the Y-axis by a first angle, the posture of the terrain object 50 is controlled so as to rotate counterclockwise about the Y-axis by a first angle. Specifically, the terrain object 50 is rotated at a predetermined rotational speed so that the rotational direction and the rotational amount of the posture of the terrain object 50 with respect to its reference posture approach the rotational direction and the rotational amount of the posture of the first object 70 with respect to its reference posture.

This linkage between the postures of the first object 70 and the terrain object 50 is explained with reference to FIG. 7 to FIG. 9.

Figure 7:
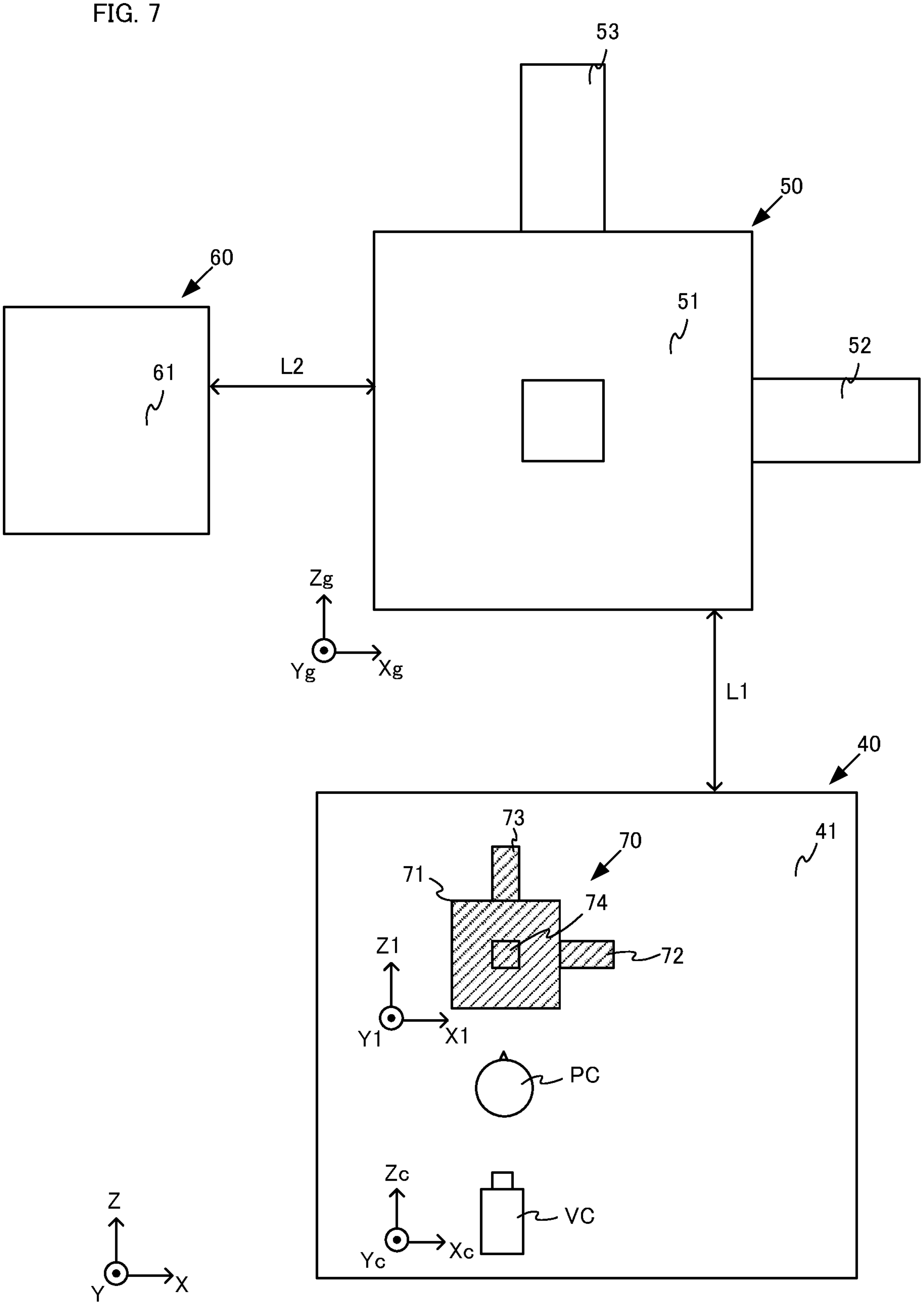
FIG. 7 is an example non-limiting diagram showing a first object 70 and a terrain object 50 viewed from above the virtual space, before the first object 70 is operated.

FIG. 7 is a diagram showing the first object 70 and the terrain object 50 viewed from above the virtual space, before the first object 70 is operated. FIG. 8 is a diagram showing the first object 70 and the terrain object 50 viewed from above the virtual space, in which the first object 70 and the terrain object 50 move in a linked manner FIG. 9 is a diagram after elapse of a predetermined time from the state shown in FIG. 8.

As shown in FIG. 7, the player character PC is positioned on the ground 41 of the terrain object 40. A virtual camera VC is arranged behind the player character PC, and a game image generated based on the virtual camera VC is displayed on the display device. The virtual camera VC moves as the player character PC moves. For the virtual camera VC, a Xc-Yc-Zc coordinate system fixed to the virtual camera is set. The Zc-axis is an axis in the direction of the line-of-sight of the virtual camera VC, the Xc-axis is an axis in the right direction from the virtual camera VC, and the Yc-axis is an axis in the upward direction from the virtual camera VC.

Further, the first object 70 is arranged at a predetermined distance away in the Y-axis direction from the ground 41 and in front of the player character PC. For example, when the first object 70 is in the reference posture, the Y1 and X1 axes fixed to the first object 70 are parallel to the Y and X axes fixed to the virtual space, respectively. The second part 72 of the first object 70 extends in the X1-axis direction from the first part 71, and a third part 73 of the first object 70 extends in a Z1-axis direction from the first part 71.

Further, a terrain object 50 is arranged at a predetermined position on the Z-axis direction of the terrain object 40. The Xg-Yg-Zg coordinate system shown in FIG. 7 is a coordinate system fixed to the terrain object 50. In a case where the terrain object 50 is in a reference posture, the Yg-axis and the Xg-axis fixed to the terrain object 50 are parallel to the Y-axis and the X-axis fixed to the virtual space, respectively. The terrain object 50 has a first part 51, a second part 52, and a third part 53. The second part 52 of the terrain object 50 extends in the Xg-axis direction from the first part 51, and the third part 53 of the terrain object 50 extends in a Zg-axis direction from the first part 51.

When the terrain object 50 is in the reference posture, the second part 52 of the terrain object 50 extends in the X-axis direction of the virtual space from the first part 51, and the third part 53 of the terrain object 50 extends in the Z-axis direction of the virtual space from the first part 51. When the terrain object 50 is in the reference posture, the distance between the terrain object 40 and the terrain object 50 (the first part 51) is L1, for example.

Figure 8:
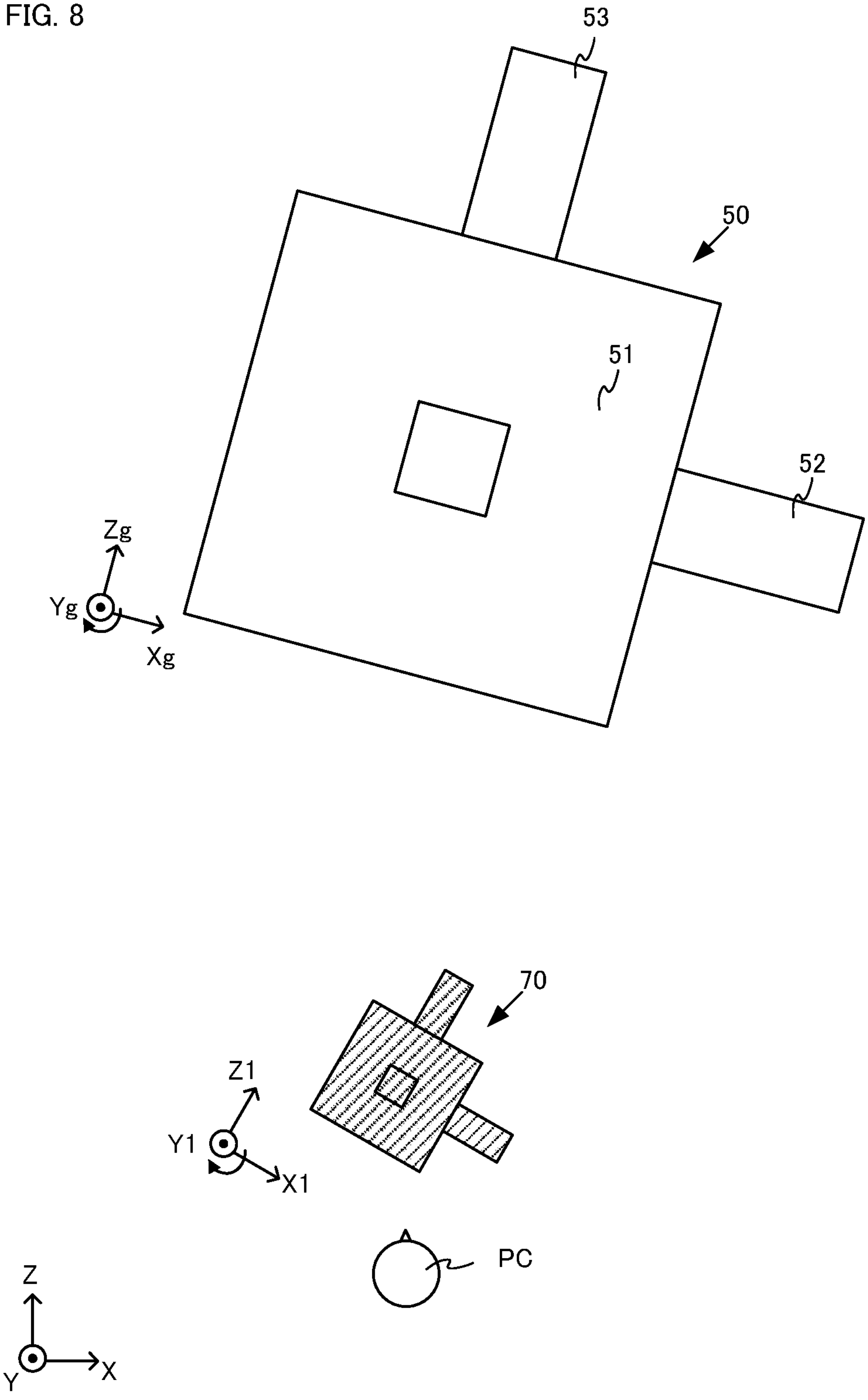
FIG. 8 is an example non-limiting diagram showing the first object 70 and the terrain object 50 viewed from above the virtual space, in which the first object 70 and the terrain object 50 move in a linked manner.

As shown in FIG. 8, if the player performs the predetermined rotation operation while the first object 70 is selected as the operation target, the first object 70 will rotate about the Y-axis. For example, in response to pressing of the A-button out of the plurality of buttons 5 of the right controller 4, the first object 70 rotates in the negative direction (clockwise in FIG. 8) about the Y-axis by a first angle. Further, for example, in response to pressing of the Y-button out of the plurality of buttons 5 of the right controller 4, the first object 70 rotates in the positive direction (counterclockwise in FIG. 8) about the Y-axis by a first angle.

When the first object 70 rotates from the reference posture, the terrain object 50 also rotates. For example, when the first object 70 rotates in the negative direction (clockwise in FIG. 8) about the Y-axis by the first angle, the terrain object 50 also rotates in the negative direction about the Y-axis by the first angle. Specifically, the terrain object 50 is rotated from the reference posture so that the rotational direction and the rotational amount of the terrain object 50 from its reference posture become closer to the rotational direction and the rotational amount of the first object 70 from its reference posture. For example, the first object 70 rotates in the negative direction about the Y-axis at a first rotational speed in response to pressing of the A-button, and the terrain object 50 rotates in the negative direction about the Y-axis at a second rotational speed that is slower than the first rotational speed. In other words, with a change in the posture of the first object 70, the posture of the terrain object 50 changes with a delay from the first object 70. For example, in FIG. 8, the first object 70 is rotated 30 degrees from the reference posture about the Y-axis, while the terrain object 50 is rotated 15 degrees from the reference posture about the Y-axis. If the first object 70 does not rotate further in the state shown in FIG. 8 and a predetermined amount of time elapses, the amount of change in the posture of the first object 70 matches the amount of change in the posture of the terrain object 50, as shown in FIG. 9.

Figure 9:
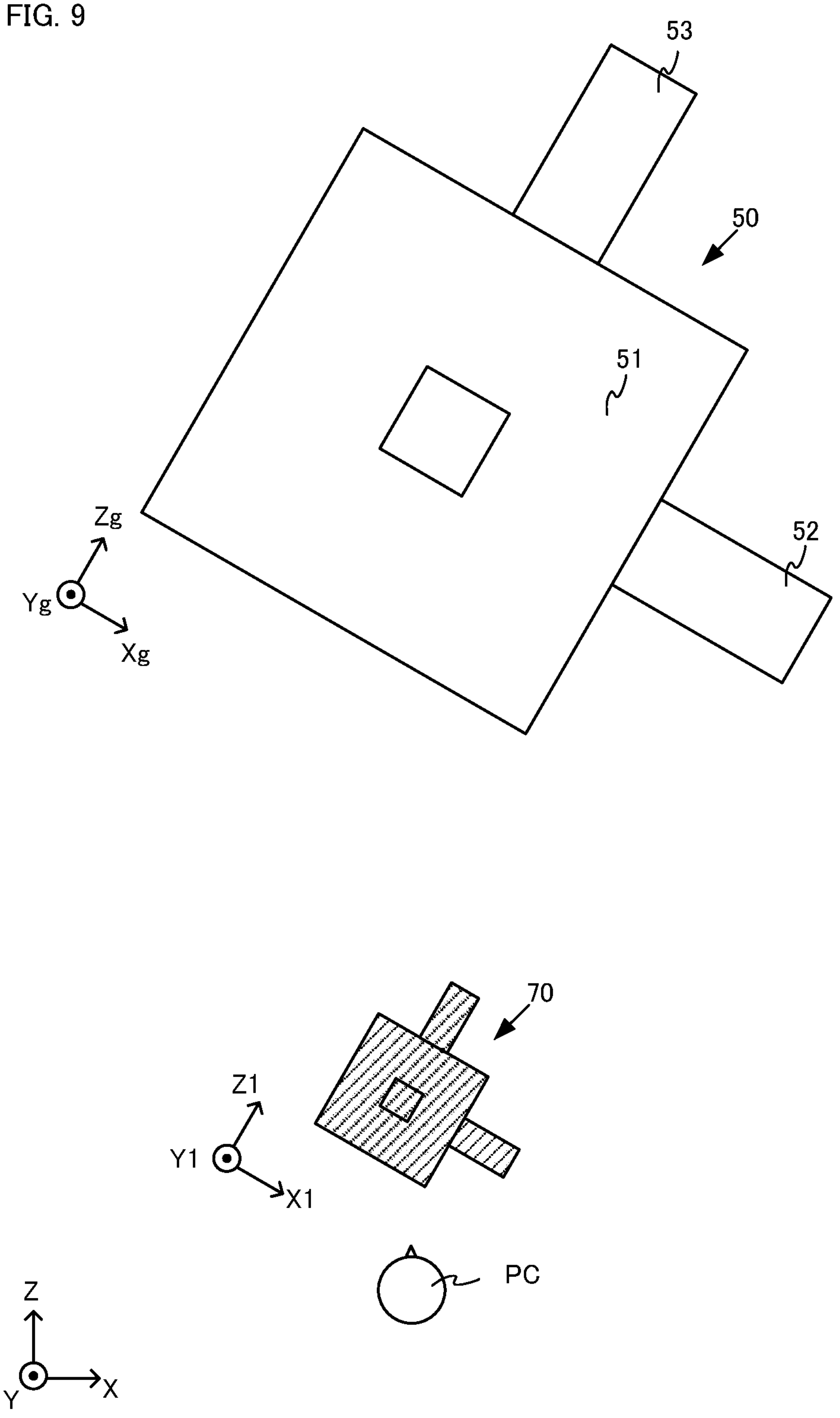
FIG. 9 is an example non-limiting diagram after elapse of a predetermined time from the state shown in FIG. 8.
Figure 10:
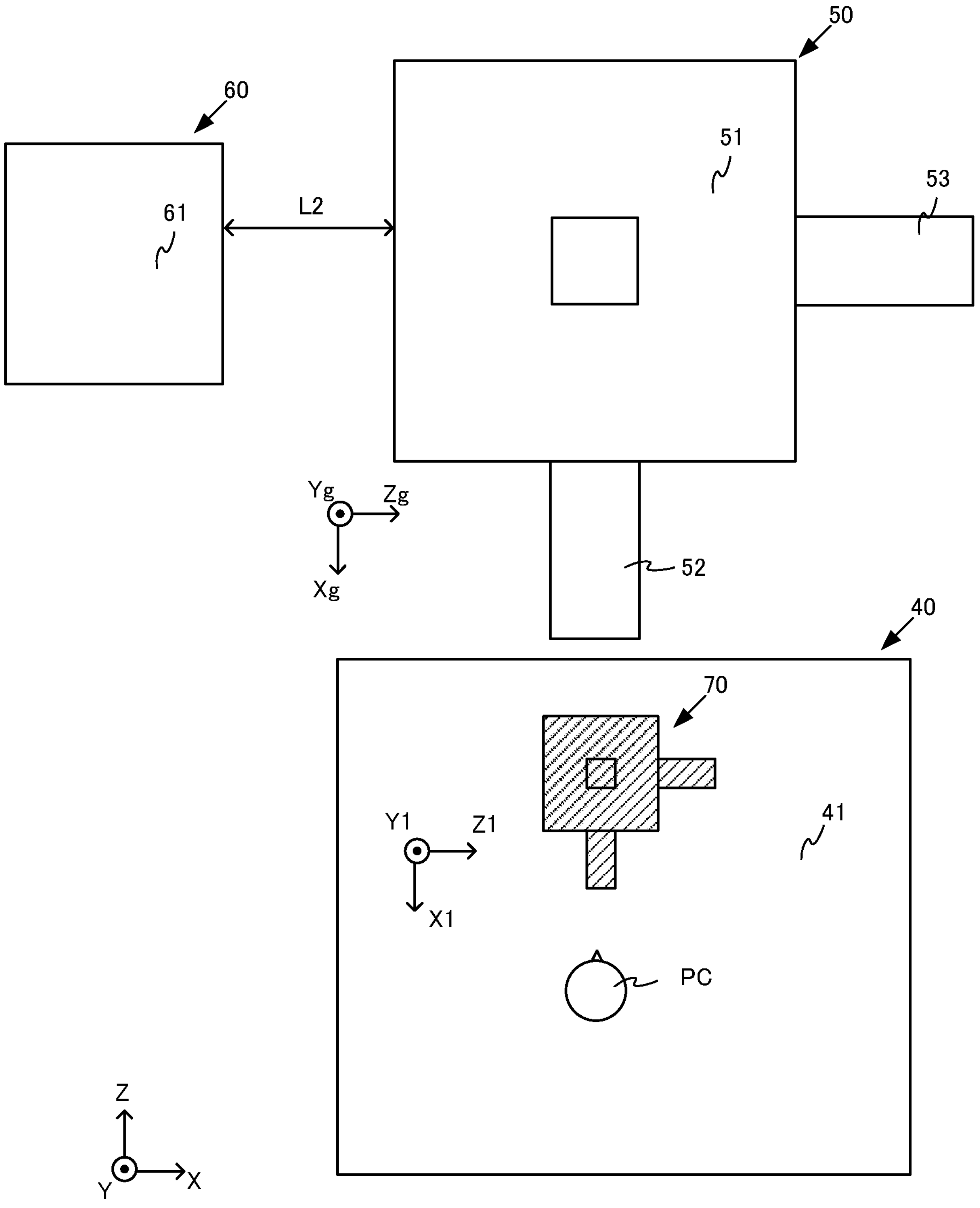
FIG. 10 is an example non-limiting diagram showing a state after the first object 70 and the terrain object 50 rotated 90 degrees in a negative direction about a Y-axis.
Figure 11:
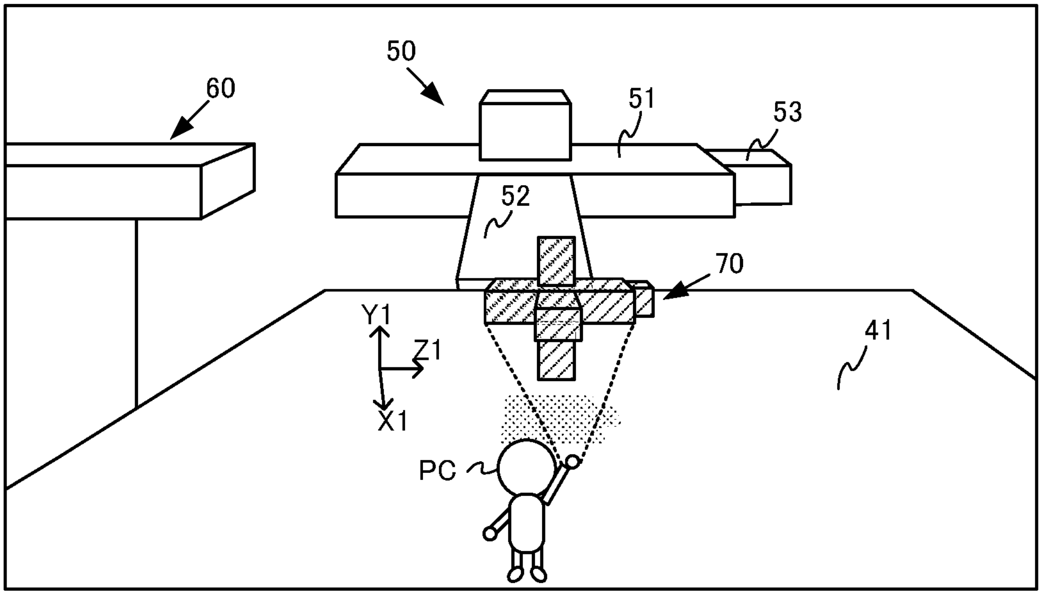
FIG. 11 is an example non-limiting diagram of a game image displayed on the screen in the state shown in FIG. 10.

If the first object 70 is rotated further from the state shown in FIG. 9, the terrain object 50 is rotated further as well. FIG. 10 is a diagram showing a state after the first object 70 and the terrain object 50 have rotated 90 degrees in the negative direction about the Y-axis. FIG. 11 is a diagram of a game image displayed on the screen in the state shown in FIG. 10.

As shown in FIG. 10, when the first object 70 rotates 90 degrees in the negative direction about the Y-axis from the reference posture and a predetermined time has elapsed, the terrain object 50 is also in the state of having rotated 90 degrees in the negative direction about the Y-axis from the reference posture. In this state, the second part 52 of the terrain object 50 extends in the negative Z-axis direction of the virtual space from the first part 51, and the distance between the terrain object 40 and the terrain object 50 is reduced from that in the reference posture (see FIG. 11). Therefore, in the state shown in FIGS. 10 and 11, the player character PC can move from the terrain object 40 to the terrain object 50 by walking or jumping. However, even in this state, terrain object 50 and terrain object 60 are separated by a distance L2, and the player character PC cannot move from terrain object 50 to terrain object 60 by walking or jumping.

Figure 12:
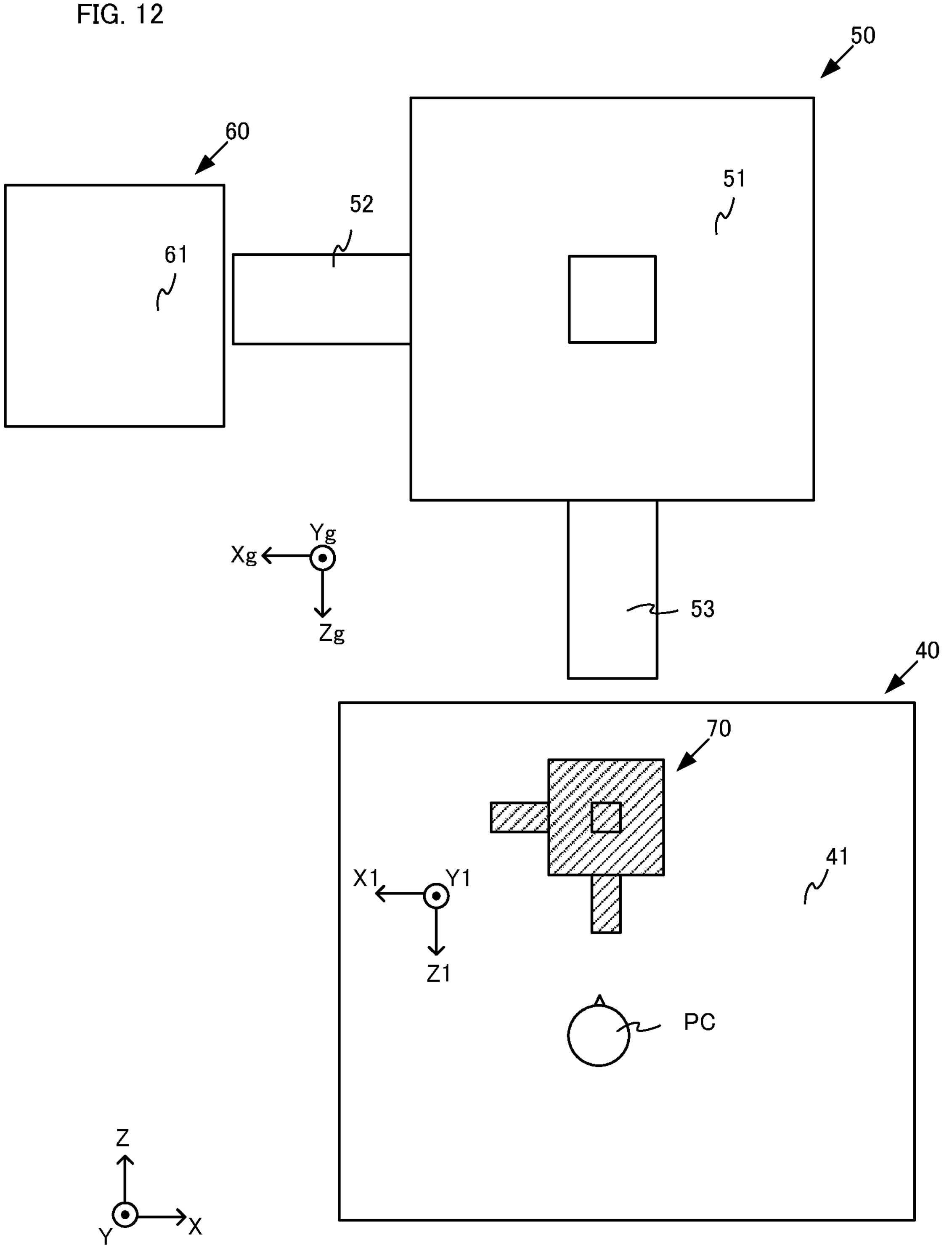
FIG. 12 is an example non-limiting diagram showing a state after the first object 70 and the terrain object 50 rotated 180 degrees about the Y-axis.
Figure 13:
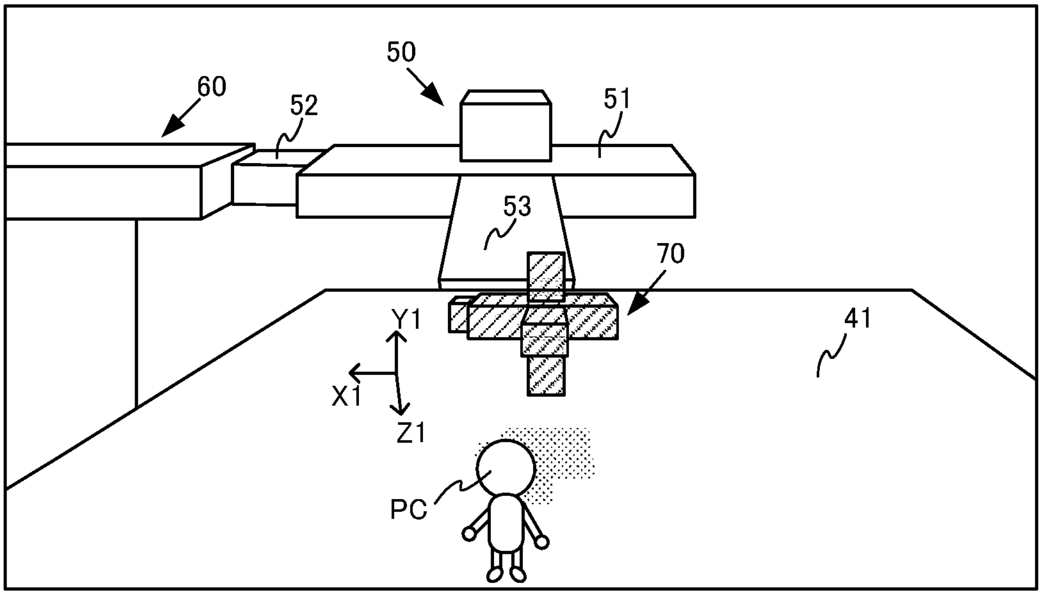
FIG. 13 is an example non-limiting diagram of a game image displayed on the screen in the state shown in FIG. 12.

Therefore, to move the player character PC from terrain object 40 to terrain object 60, the player further rotates the first object 70. FIG. 12 is a diagram showing a state after the first object 70 and the terrain object 50 have rotated 180 degrees about the Y-axis. FIG. 13 is a diagram of a game image displayed on the screen in the state shown in FIG. 12.

As shown in FIG. 12, when the first object 70 is rotated 180 degrees about the Y-axis, the terrain object 50 also rotates 180 degrees about the Y-axis. In this state, the second part 52 of the terrain object 50 extends in the negative X-axis direction of the virtual space from the first part 51, and the third part 53 of the terrain object 50 extends in the negative Z-axis direction of the virtual space from the first part 51. This results in a shorter distance between the terrain object 40 and the terrain object 50 as compared to that in the reference posture, and the distance between terrain object 40 and the terrain object 60 is also reduced from that in the reference posture (see FIG. 13). Therefore, in the state shown in FIG. 12 and FIG. 13, the player character PC can move from the terrain object 40 to the terrain object 50 by walking or jumping action, and can also move from the terrain object 50 to the terrain object 60.

It should be noted that the above description with reference to FIG. 8 and FIG. 13 deals with a case of rotating the first object 70 about the upward-downward axis (i.e., in a yaw direction) of the virtual space. In the present exemplary embodiment, the first object 70 can be rotated about a horizontal axis of the screen (i.e., in a pitch direction), while the first object 70 is selected as the operation target, in response to the rotation operation by the player.

Figure 14:
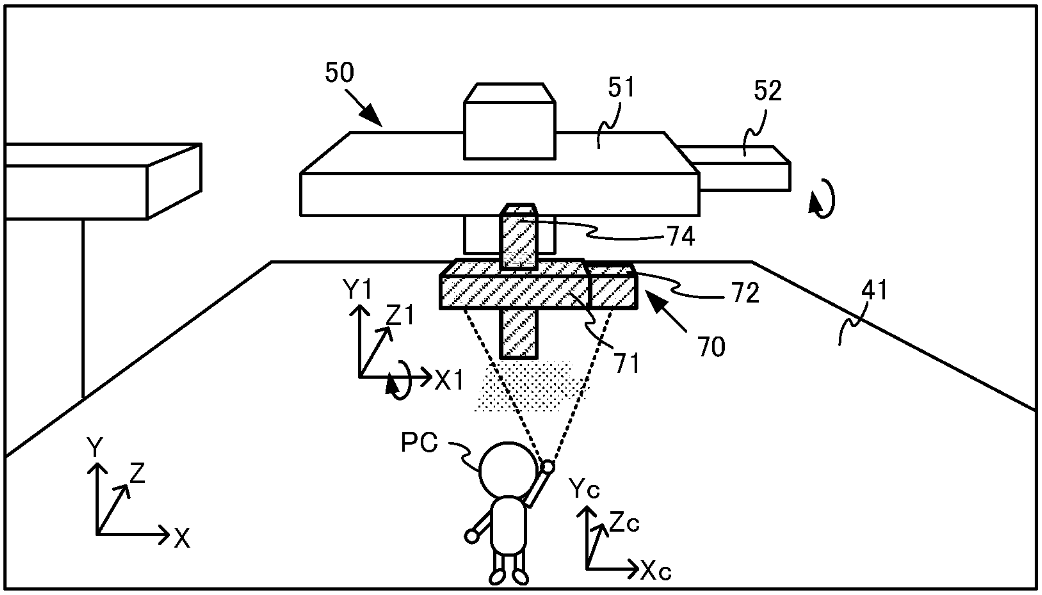
FIG. 14 is an example non-limiting diagram showing rotation of the first object 70 about a horizontal axis of a screen.

FIG. 14 is a diagram showing rotation of the first object 70 about a horizontal axis of the screen.

As shown in FIG. 14, for example, when the B-button out of the plurality of buttons 5 of the right controller 4 is pressed, the first object 70 rotates by the first angle in the positive direction (i.e., in the pitch direction) about the Xc-axis that is the rightward axis of the virtual camera VC. Further, for example, when the X-button out of the plurality of buttons 5 of the right controller 4 is pressed, the first object 70 rotates by the first angle in the negative direction about the Xc-axis. With this rotation of the first object 70 in the pitch direction, the terrain object 50 also rotates in the pitch direction. For example, the first object 70 rotates in the negative direction about the Xc-axis at a first rotational speed in response to pressing of the A-button, and the terrain object 50 rotates in the negative direction about the Xc-axis at a second rotational speed that is slower than the first rotational speed.

Further, the first object 70 may rotate about the Zc-axis of the virtual camera VC (i.e., in the roll direction) in response to a predetermined rotation operation while the first object 70 is selected as the operation target. With the rotation of the first object 70 about the Zc-axis, the terrain object 50 also rotates about the Zc-axis.

As described, in the game of the present exemplary embodiment, a first object for operating a terrain object is arranged in the virtual space. With a change in the posture of the first object, the posture of the terrain object corresponding to the first object changes. The game can be progressed by moving the player character PC in the virtual space, while changing the posture of the first object to change the posture of the terrain object.

A plurality of first objects and terrain objects corresponding to the first objects, respectively, are arranged in the virtual space, in addition to those illustrated in the drawings. The terrain object may be any object as long as the player character PC can move thereon. Such a first object corresponding to a terrain object is arranged in the virtual space, and by changing the posture of the first object, the posture of the corresponding terrain object is changed. For example, the terrain object may be a building that has walls and a roof, and the player character PC may be able to move on the roof of the building. The first object corresponding to this building as the terrain object may be arranged inside the building. When the first object is selected as the operation target and rotated about the Y-axis of the virtual space, for example, the walls and roof (ceiling) of the building except for the floor, may be rotated about the Y-axis of the virtual space.

Further, the position of the terrain object may be changeable by changing the position of the first object. For example, the first object is initially arranged at the reference position in the virtual space. Further, the terrain object is initially arranged at the reference position in the virtual space. When the first object is moved by a predetermined movement amount in the first direction from the reference position in response to a move operation by the player while the first object is selected as the operation target, the terrain object moves by the predetermined movement amount in the first direction from the reference position. In this case, the terrain object is moved so that the moving direction and the movement amount of the terrain object from its reference position become close to the moving direction and the movement amount of the first object from its reference position. Specifically, the first object may move at a first speed and the terrain object may move at a second speed that is slower than the first speed, in response to the move operation by the player.

Figure 15:
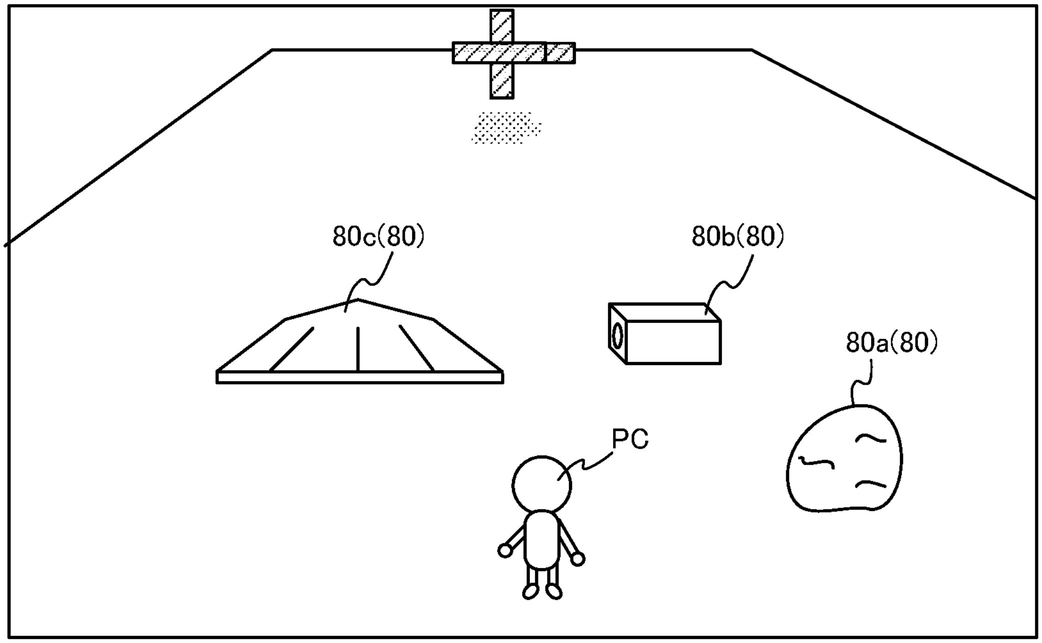
FIG. 15 is an example non-limiting diagram of a plurality of virtual objects 80 arranged in a virtual space.

Next, a virtual object 80 arranged in the virtual space is described. The virtual object 80 is an exemplary operable object that can be operated by the above-mentioned special ability of the player character PC. FIG. 15 is a diagram of a plurality of virtual objects 80 arranged in the virtual space.

Figure 16:
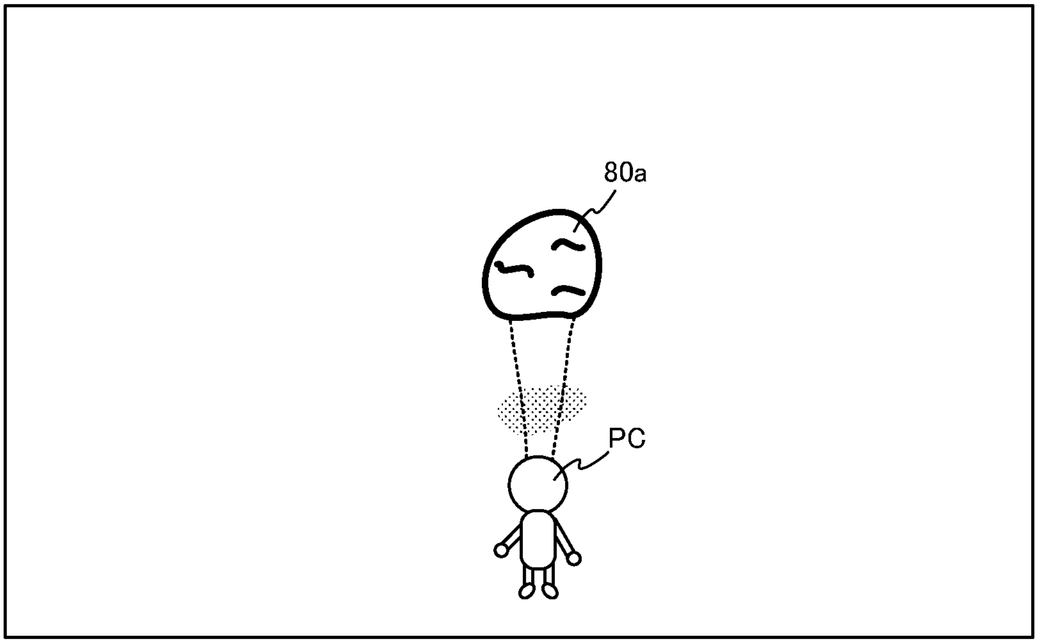
FIG. 16 is an example non-limiting diagram showing how a rock object 80*a* arranged in a virtual space is selected as an operation target and operated.

As shown in FIG. 15, various types of virtual objects 80 are arranged in the virtual space. For example, a rock object 80*a* is arranged in the virtual space as a virtual object 80. FIG. 16 is a diagram showing how the rock object 80*a* arranged in the virtual space is selected as the operation target and operated. The rock object 80*a* is an object simulating a rock and has a predetermined mass. As shown in FIG. 16, the player can select the rock object 80*a* as the operation target, move the rock object 80*a* in the virtual space, and change the posture of the rock object 80*a*.

As shown in FIG. 15, the thrust object 80*b* and the wing object 80*c* are arranged in the virtual space as the virtual objects 80. The thrust object 80*b* is, for example, an object simulating a jet engine and is an object that generates thrust. The thrust object 80*b* generates thrust in the direction opposite to a jetting direction of the jet. Further, the wing object 80*c* is an object that, when moved in the virtual space beyond a predetermined speed, generates buoyancy in the upward direction of the virtual space so as to allow flying in the virtual space. The player can operate these virtual objects 80 by using the special ability of the player character PC, and coupling these virtual objects 80 with each other to create an assembled object that includes a plurality of operable objects. For example, when the thrust object 80*b* is selected as an operation target and the thrust object 80*b* is brought closer to the wing object 80*c*, the thrust object 80*b* is coupled with the wing object 80*c*. This generates an assembled object (airplane object) that includes the thrust object 80*b* and the wing object 80*c*. The airplane object can fly in the virtual space by the thrust of the thrust object 80*b*. The player character PC can board the airplane object to fly in the virtual space. The assembled object generated can be further coupled with another virtual object 80.

The player can couple the virtual object 80 with the first object 70.

Figure 17:
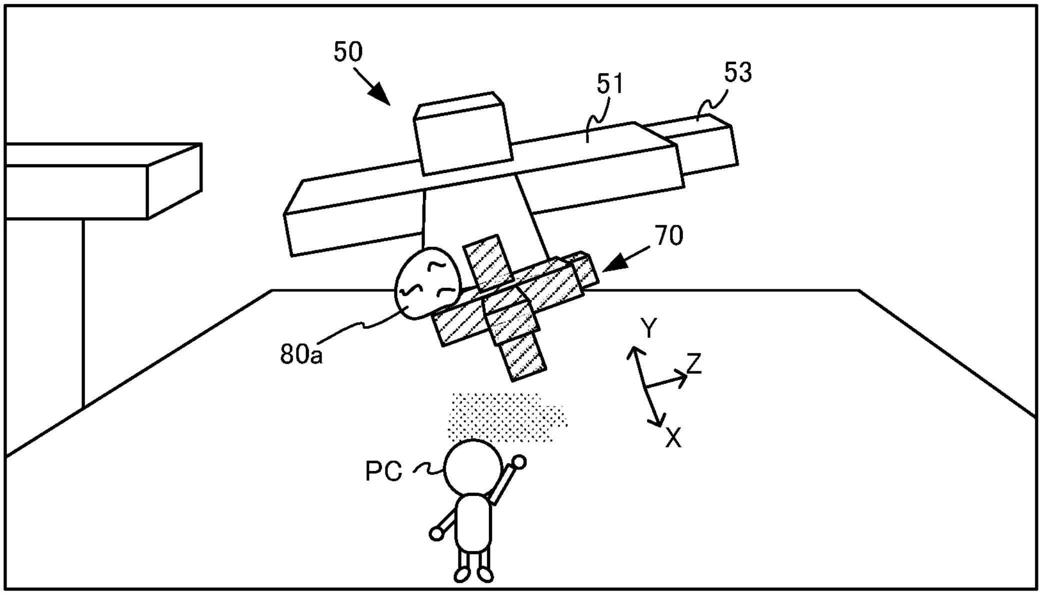
FIG. 17 is an example non-limiting diagram showing an exemplary game image when the rock object 80*a* is connected to the first object 70.

FIG. 17 is a diagram showing an exemplary game image when the rock object 80*a* is coupled with the first object 70.

For example, as shown in FIG. 16, the rock object 80*a* is selected as the operation target, and the rock object 80*a* is moved closer to the first object 70. When the rock object 80*a* and the first object 70 meet a predetermined coupling condition, the rock object 80*a* is coupled with the first object 70. For example, the coupling condition is that a distance between the rock object 80*a* and the first object 70 is less than a predetermined value, and an instruction for coupling is given by the player.

As shown in FIG. 17, when the rock object 80*a* having a predetermined mass is coupled with the first object 70, the posture of the first object 70 changes. Specifically, if the rock object 80*a* is coupled with the first object 70, the position of the center of gravity of the assembled object (including the first object 70 and the rock object 80*a*) changes. This change in the position of the center of gravity changes the posture of the first object 70 (the assembled object). Even if the rock object 80*a* is coupled with the first object 70, the first object 70 (the assembled object) does not fall to the ground 41 and stays floating in the air. More specifically, a physics calculation takes place based on the mass of the first object 70, the mass of the rock object 80*a*, and the position where the rock object 80*a* is coupled. The gravity affecting each object and the buoyancy of the first object 70 are calculated to obtain a posture of the first objects 70 (assembled objects) that balances these forces.

In a case where the rock object 80*a* is coupled with the first object 70 as described, the posture of the first object 70 may change due to the effect of the virtual gravity on the rock object 80*a*, even if the first object 70 is not selected as the operation target. Even in such a case, the posture of the terrain object 50 changes according to the change in the posture of the first object 70. For example, for a predetermined period of time immediately after the rock object 80*a* is coupled with the first object 70, the posture of the first object 70 gradually changes from the reference posture. After the predetermined period of time has elapsed, the gravity affecting each of the objects (the first object 70 and the rock object 80*a*) in the assembled object is balanced with the buoyancy of the first object 70, thus stabilizing the posture of the first object 70 (stopping the change in the posture). Even if the first object 70 is not selected as the operation target, the posture of the first object 70 changes during this predetermined period of time, and the posture of the terrain object 50 changes accordingly.

The player character PC can also board the first object 70, although illustration is omitted. When the player character PC boards the first object 70, the posture of the first object 70 changes due to the gravity affecting the player character PC. The posture of the terrain object 50 changes with the change in the posture of the first object 70.

Figure 18:
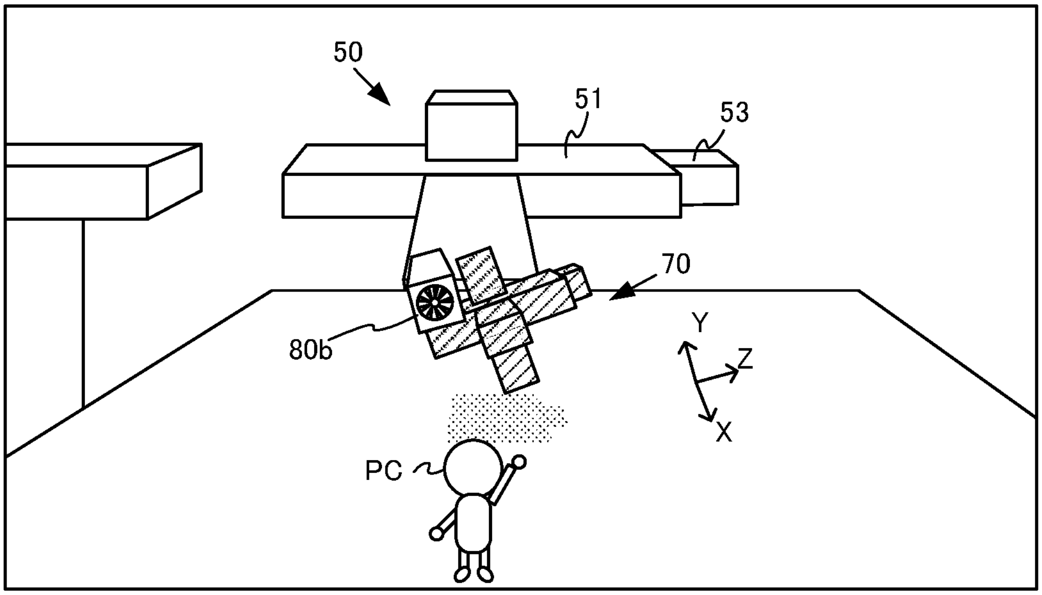
FIG. 18 is an example non-limiting diagram showing an exemplary game image when a thrust object 80*b* is connected to the first object 70.

FIG. 18 is a diagram showing an exemplary game image when the thrust object 80*b* is coupled with the first object 70.

As shown in FIG. 18, when the thrust object 80*b* that generates thrust is coupled with the first object 70, the posture of the first object 70 changes. Specifically, in a case where the thrust object 80*b* is coupled with the first object 70, the virtual gravity affecting the thrust object 80*b* is added to the assembled object including the first object 70 and the thrust object 80*b*. Further, the thrust object 80*b* generates thrust in a predetermined direction. The gravity and the thrust cause a motion (rotation) of the first object 70 (the assembled object). The first object 70 is configured not to move by the thrust given by the thrust object 80*b*. Further, even if the thrust object 80*b* is coupled with the first object 70, the first object 70 (the assembled object) does not fall to the ground 41 and stays floating in the air. Specifically, a physical calculation takes place based on the mass of the first object 70, the mass of the thrust object 80*b*, the position where the thrust object 80*b* is coupled, and the thrust given by the thrust object 80*b* so as to calculate a motion of the first object 70. If the thrust object 80*b* continues to generate thrust, the posture of the first object 70 continues to change.

When a motion of the first object 70 is caused by having the thrust object 80*b* coupled with the first object 70 as described above, the posture of the terrain object 50 also changes with the change in the posture of the first object 70. If the posture of the first object 70 continues to change, the posture of the terrain object 50 will continue to change with the change in the posture of the first object 70, even when the first object 70 is not selected as the operation target. For example, while the thrust object 80*b* continues to generate thrust, the first object 70 continues to rotate in a predetermined position. The terrain object also continues to rotate with the rotation of the first object 70. The first object 70 may change its posture and move in the virtual space by the thrust given by the thrust object 80*b*. In this case, the terrain object also moves as the first object 70 moves.

As described above, in the game according to this exemplary embodiment, the player character PC has the special ability to operate operable objects arranged in the virtual space. The player uses the special ability of the player character PC to change at least the posture of the first object 70 arranged in the virtual space to change the posture of the terrain object. This allows the player to progress the game while changing the terrain using the first object 70 arranged in the virtual space.

Further, the player can couple the virtual object 80 with the first object 70 and change the posture of the first object 70 by the gravity or the thrust given by the virtual object 80. This way, the posture of the first object 70 is automatically changed, thus changing the posture of the terrain object, without a need for directly operating the first object 70 by using the above-described special ability of the player character PC.

While the player character PC is positioned on the terrain object 50 corresponding to the first object 70, operations of the first object 70 using the above special ability are restricted. For example, the first object 70 may not be selectable as the operation target, while the player character PC is positioned on the terrain object 50. This disables operation of the first object 70 while the player character PC is positioned on the terrain object 50. If the first object 70 is operable while the player character PC is positioned on the terrain object 50, the posture of the terrain object 50 changes. This causes a change in the positional relationship between the player character PC and the first object 70, and the first object 70 may become no longer operable. For example, a change in the posture of the terrain object 50 may cause the player character PC to fall, or a change in the positional relationship between the player character PC and the first object 70 may unintentionally cause a significant change in the first object 70, thus shaking the player character PC off the terrain object 50. Therefore, while the player character PC is positioned on the terrain object 50, operations of the first object 70 by using the above-described special ability are disabled. Specifically, when the player character PC is positioned on the terrain object 50, the first object 70 is restricted from being selected as the operation target. It should be noted that it is possible to enable selection of the first object 70 as the operation target, but operations of the first object 70 are restricted or disabled, while the player character PC is positioned on the terrain object 50.

For example, when the thrust object 80*b* is coupled with the first object 70, the posture of the first object 70 may change with or without the player's operation. In this case, the posture of the 50 terrain objects also changes, but the player character PC can still move to the terrain objects 50 even when the posture of the terrain objects 50 is changing.

(Game Processing Details)

Figure 19:
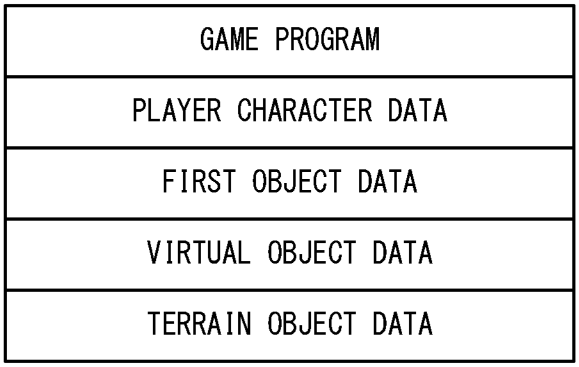
FIG. 19 is an example non-limiting diagram showing exemplary data stored in a memory of the main body apparatus 2 while game processing is executed.

Next, the game processing related to the games described above will be detailed. First, the data used for the game processing will be described. FIG. 19 is a diagram showing exemplary data stored in a memory of the main body apparatus 2 while game processing is executed.

As shown in FIG. 19, the memory (DRAM 27, flash memory 26, or external storage medium) of the main body apparatus 2 stores the game program, player character data, first object data, virtual object data, and terrain object data.

The game program is a program for executing the game processing described later. The game program is stored in advance in the external storage medium mounted in the slot 29 or the flash memory 26, and is read into the DRAM 27 at a time of executing the game. The game program may be obtained from another device via a network (e.g., the Internet).

The player character data is data related to the player character PC and includes information related to the position and posture of the player character PC in the virtual space. The player character data includes information indicating an item, an ability, and the like owned by the player character PC, and data pertaining to the shape of the player character PC.

The first object data is the data regarding the first object 70 arranged in the virtual space. The first object data includes data representing the position and posture of the first object 70 in the virtual space. For example, the first object data includes data regarding the reference position of the first object 70, data regarding the reference posture of the first object 70, data indicating the moving direction and the movement amount from the reference position, and data indicating the rotational direction and the rotational amount from the reference posture. Based on these sets of data, the current position and the posture of the first object 70 are determined. Further, when the virtual object 80 is coupled with the first object 70, the first object data includes information regarding the coupled virtual object 80 (information regarding the type, mass, coupling position, and the like of the virtual object 80).

The virtual object data is data regarding the virtual object 80 (e.g., rock object 80*a*, thrust object 80*b*, wing object 80*c*, and the like) arranged in the virtual space. The virtual object data includes data representing the position and the posture of each virtual object 80 in the virtual space. Further, when an assembled object including a plurality of virtual objects 80 is generated, the virtual object data includes information (position of the center of gravity, mass, and the like) regarding the assembled object.

The terrain object data is data regarding each of a plurality of terrain objects arranged in the virtual space. Specifically, the terrain object data includes data representing the position and the posture of each terrain object in the virtual space. For example, the terrain object data includes data regarding the reference position of the terrain object 50, data regarding the reference posture of the terrain object 50, data indicating the moving direction and the movement amount from the reference position of the terrain object 50, and data indicating the rotational direction and the rotational amount from the reference posture of the terrain object 50. Based on these sets of data, the current position and the posture of the terrain object 50 are determined.

Figure 20:
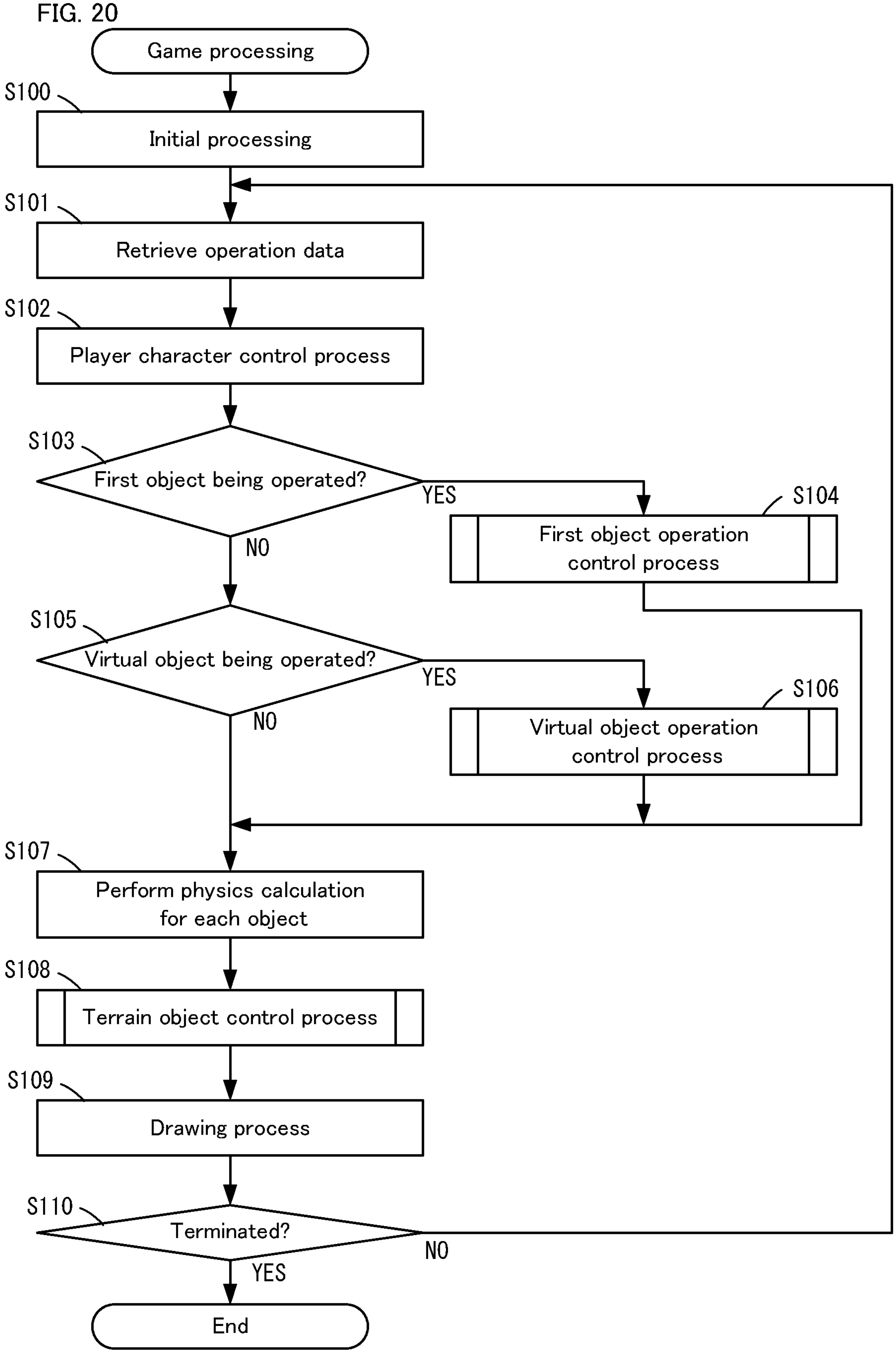
FIG. 20 is an example non-limiting flowchart showing exemplary game processing executed by a processor 21 of the main body apparatus 2.

Next, the following details the game processing performed in the main body apparatus 2. FIG. 20 is a flowchart showing exemplary game processing executed by the processor 21 of the main body apparatus 2.

As shown in FIG. 20, when the game processing is started, the processor 21 executes initial processing (step S100). Specifically, the processor 21 sets a virtual space and arranges a player character PC, a virtual camera VC, a first object 70 and a plurality of virtual objects 80 as the operable objects, a plurality of terrain objects, and the like in the virtual space. In addition to these objects, objects that are different from the operable objects (e.g., tree objects fixed in the virtual space, enemy characters) are arranged in the virtual space.

Next, the processor 21 retrieves operation data from the controller (step S101). The operation data includes data corresponding to an operation of the button 5 and the analog stick 6 of the left controller 3, and the buttons 5 and the analog stick 6 of the right controller 4. The main body apparatus 2 receives the operation data from each controller at predetermined time intervals (e.g., at intervals of 1/200 second), and stores the operation data in a memory. In step S101, the processor 21 retrieves the operation data transmitted from each controller and stored in the memory. After this, the processor 21 repeats the processing from steps S101 to S110 at predetermined frame time intervals (e.g., at intervals of 1/60 second).

Next, the processor 21 performs a player character control process (step S102). In the process, the processor 21 controls the player character PC based on the operation data. For example, if the player performs a move operation (e.g., operation on the analog stick 6 of the left controller 3), the processor 21 moves the player character PC by a movement amount equivalent to a single frame. When the player performs a selection operation (e.g., operation on a predetermined button of the controller), the processor 21 selects any of the plurality of operable objects arranged in the virtual space. For example, if a predetermined button is pressed while the first object 70 is in front of the player character PC, the processor 21 selects the first object 70 as the operation target. When the player character PC is positioned on the terrain object 50 corresponding to the first object 70, the processor 21 does not select the first object 70 as the operation target even if the first object 70 exists in front of the player character PC and the predetermined button is pressed. Further, when the predetermined button is pressed while the virtual object 80 is in front of the player character PC, the processor 21 selects the virtual object 80 as the operation target. The processor 21 changes the display mode of the currently selected operation object to a specific display mode. Further, the processor 21 causes the player character PC to initiate a jumping action or an attack action in response to the player operation. When the player character PC initiates a jumping action or an attacking action, these actions are performed over a plurality of frames.

Next, the processor 21 determines whether the first object 70 is being operated as the operation target (step S103). If the first object 70 is being operated (step S103: YES), the processor 21 performs a first object operation control process (step S104). The first object operation control process controls at least the posture of the first object 70 based on the operation data. The following details the first object operation control process in step S104.

(First Object Operation Control Process)

Figure 21:
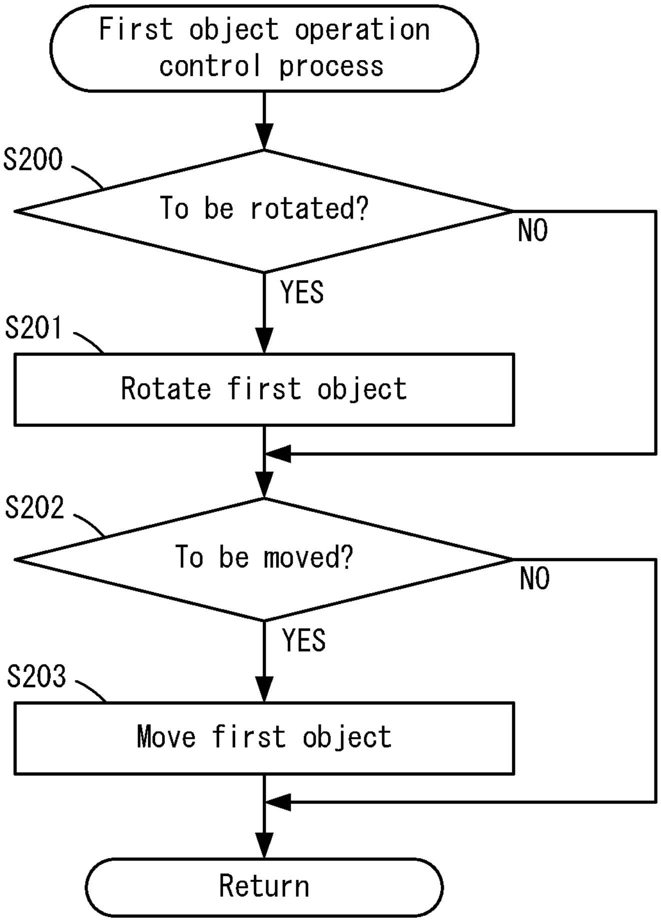
FIG. 21 is an example non-limiting flowchart showing an exemplary first object operation control process of step S104.

FIG. 21 is a flowchart showing an exemplary first object operation control process of step S104.

As shown in FIG. 21, the processor 21 determines whether to rotate the first object 70 being operated (step S200). For example, the processor 21 determines whether any of the plurality of buttons 5 of the right controller 4 is pressed. If any of the plurality of buttons 5 is pressed, the processor 21 determines Yes in step S200.

If it is determined that the first object 70 is to be rotated (step S200: YES), the processor 21 rotates the first object 70 in the direction corresponding to the button being pressed (step S201). For example, if the A-button or the Y-button out of the plurality of buttons 5 is pressed, the processor 21 causes the first object 70 to rotate by the first angle about the Y-axis of the virtual space. If the B-button or the X-button out of the plurality of buttons 5 is pressed, the processor 21 causes the first object 70 to rotate by the first angle about the Xc-axis. If the predetermined rotation operation is performed, the first object 70 may be rotated by a first angle about the Zc-axis in step S201.

When step S201 is executed, or when step S200 results in NO, the processor 21 determines whether to move the first object 70 being operated in the virtual space (step S202). Specifically, the processor 21 determines whether a predetermined move operation is performed by using the controller. For example, if the analog stick 6 of the left controller 3 or the right controller 4 is operated, the processor 21 determines YES in step S202.

If it is determined that the first object 70 is to be moved (step S202: YES), the processor 21 moves the first object 70 (step S203). For example, the processor 21 moves the first object 70 by the first movement amount in the direction of the virtual space corresponding to a directional input from the analog stick 6. It should be noted that the movement range of the first object 70 is restricted. For example, the first object 70 can only move within a predetermined movement range and cannot move beyond that range.

It should be noted that the position of the first object 70 may be fixed. In this case, step S202 and step S203 do not have to be performed. That is, the first object 70 may be fixed in the virtual space so that it is not moved in parallel within the virtual space. While the first object 70 is not moved in parallel within the virtual space, the center position of the first object 70 may or need not to change with the rotation of the first object 70.

If step S203 is performed, or if step S202 results in NO, the processor 21 terminates the process shown in FIG. 21 and returns to FIG. 20.

Returning to FIG. 20, if the first object 70 is not being operated (step S103: NO), the processor 21 determines whether the virtual object 80 is being operated as an operation target (step S105). If the virtual object 80 is being operated (step S105: YES), the processor 21 performs the virtual object operation control process (step S106). The virtual object operation control process is a process of controlling the virtual object 80 based on the operation data. The following details the virtual object operation control process in step S106.

(Virtual Object Operation Control Process)

Figure 22:
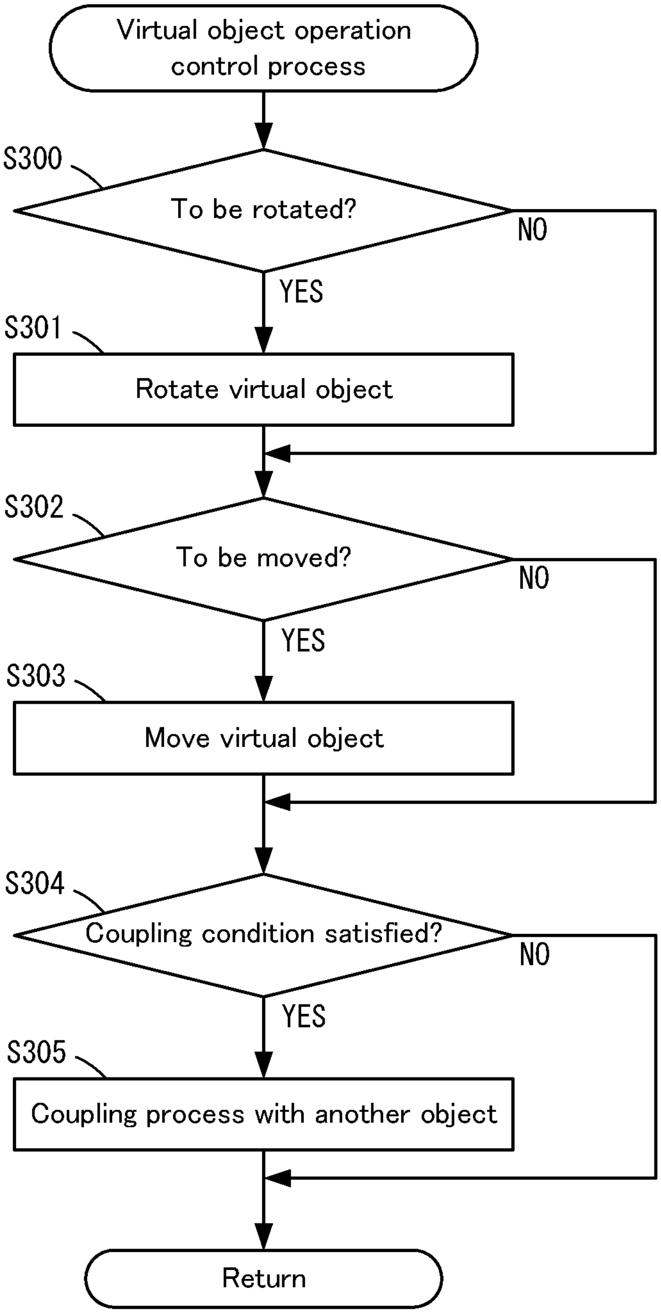
FIG. 22 is an example non-limiting flowchart showing an exemplary virtual object operation control process of step S106.

FIG. 22 is a flowchart showing an exemplary virtual object operation control process of step S106.

As shown in FIG. 22, the processor 21 determines whether to rotate the virtual object 80 being operated (step S300), and the virtual object 80 is rotated if the processor 21 determines to rotate (step S301). Step S300 and step S301 are the same as step S200 and step S201, except in the operation target, so a detailed description therefor is omitted.

When step S301 is executed, or when step S300 results in NO, the processor 21 determines whether to move the virtual object 80 being operated in the virtual space (step S302). Specifically, the processor 21 determines whether a predetermined move operation is performed by using the controller. For example, if the analog stick 6 of the left controller 3 or the right controller 4 is operated, the processor 21 determines YES in step S302.

When it is determined that the virtual object 80 is to be moved (step S302: YES), the processor 21 moves the virtual object 80 by a movement amount equivalent to a single frame (step S303). For example, the processor 21 moves the virtual object 80 by the first movement amount in the direction of the virtual space corresponding to a directional input from the analog stick 6. In step S303, the movement of the virtual object 80 is not restricted, unlike step S203 described above. In other words, the virtual object 80 is configured to move to any position in the virtual space according to the move operation by the player. Further, in step S303, the movement of the virtual object 80 may be restricted as in step S203.

When step S303 is executed, or when step S302 results in NO, the processor 21 determines whether the virtual object 80 being operated satisfies the coupling condition for coupling with another object (step S304). For example, if the virtual object 80 being operated is positioned near the first object 70 and a predetermined instruction is given by the player, the processor 21 determines YES in step S304. Further, for example, if the virtual object 80 being operated is positioned near another virtual object 80 and a predetermined instruction is given by the player, the processor 21 determines YES in step S304.

When it is determined that the virtual object 80 being operated satisfies the coupling condition for coupling with another object (step S304: YES), the processor 21 performs a coupling process between the virtual object 80 and the other object (step S305). For example, if the virtual object 80 being operated is positioned near the first object 70 and a predetermined instruction is given by the player, the processor 21 performs a process of coupling the virtual object 80 with the first object 70. For example, the processor 21 couples the virtual object 80 with the first object 70 at a position where these two objects are closest to each other at the time the predetermined instruction is given by the player. As a result, the virtual object 80 and the first object 70 are coupled at the coupling position, and these objects behave as one thereafter as an assembled object. Depending on the positional relationship between the virtual object 80 and the first object 70 at the time the predetermined instruction is given, the coupling position will be different and the position of the center of gravity of the assembled object will be different. Depending on the position of the center of gravity of the assembled objects, the posture of the first object 70 after being coupled will be different. The player can couple the virtual object 80 to a desirable position of the first object 70, taking into account the change in the posture of the first object 70.

If step S305 is performed, or if step S304 results in NO, the processor 21 terminates the process shown in FIG. 22 and returns to FIG. 20.

Returning to FIG. 20, if the virtual object 80 is not being operated (step S105: NO), or if step S104 or step S106 is performed, the processor 21 performs the physics calculation for each object (step S107). The physics calculation in this step is performed for each object based on the forces applied to each object in the virtual space, the mass of each object, the current motion of each object, and the like. Then, based on the results of the physics calculation, each object makes a motion in the virtual space. For example, if the player character PC is in the air, the position of the player character PC is updated by causing a downward accelerated motion of the player character PC based on the gravity working downward in the virtual space. Further, for example, when the virtual object 80 is coupled with the first object 70, a motion of the assembled object including the first object 70 and the virtual object 80 is calculated. For example, if the virtual object 80 is a rock object 80*a*, a motion of the assembled object (first object 70) is calculated based on the gravity affecting the rock object 80*a* and the coupling position of the rock object 80*a*. Further, for example, if the virtual object 80 is a thrust object 80*b*, a motion of the assembled object (first object 70) is calculated based on the thrust and the coupling position of the thrust object 80*b*, and the gravity affecting the thrust object 80*b*. Further, when the player character PC is on the first object 70, the movement of the first object 70 is calculated based on the gravity affecting the player character PC and the position of the player character PC. As a result of the calculation, the posture and the position of the first object 70 in the virtual space are determined. It should be noted that the first object 70 may be configured to be capable of changing only its posture, and the position of the first object 70 may be fixed. Further, the first object 70 may be configured to be movable only within a predetermined movement range.

Next, the processor 21 performs a terrain object control process (step S108). In the process, the processor 21 controls the posture or the position of the terrain object. The following details the terrain object control process in step S108.

(Terrain Object Control Process)

Figure 23:
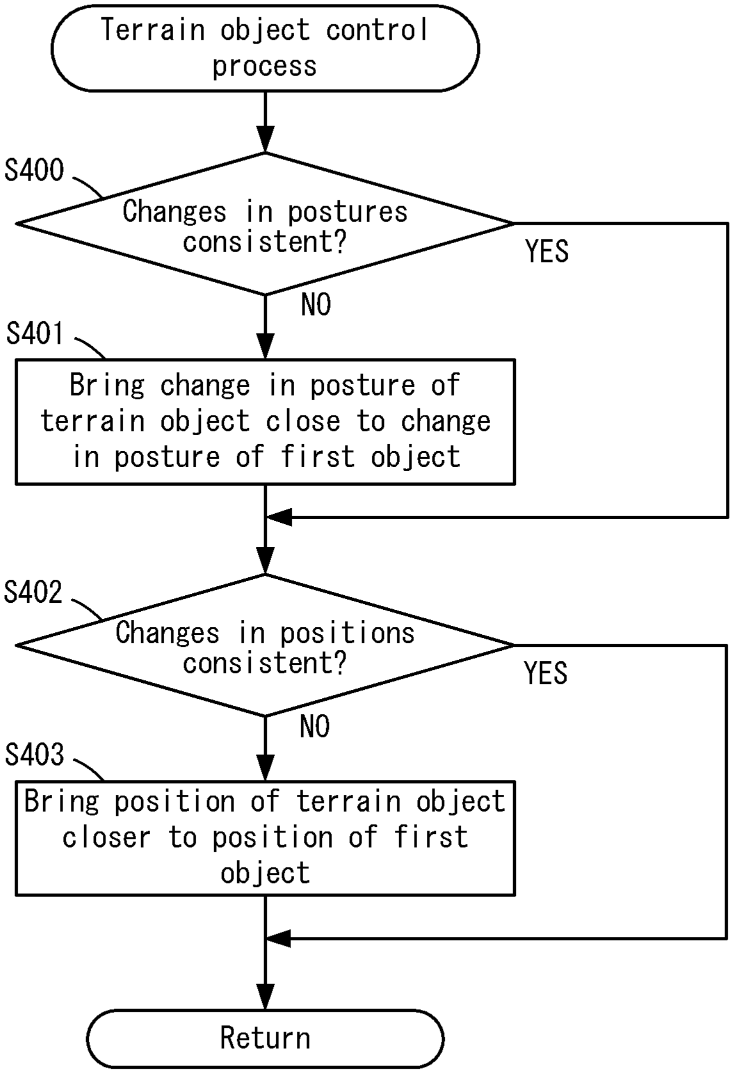
FIG. 23 is an example non-limiting flowchart showing an exemplary terrain object control process of step S108.

FIG. 23 is a flowchart showing an exemplary terrain object control process of step S108.

As shown in FIG. 23, the processor 21 determines whether the change in the posture of the terrain object 50 is consistent with the change in the posture of the first object 70 (step S400). In the process, the processor 21 determines whether the rotational direction and the rotational amount of the posture of the terrain object 50 from its reference posture are consistent with the rotational direction and the rotational amount of the posture of the first object 70 from its reference posture. If the rotational direction and the rotational amount of the terrain object 50 from the reference posture are consistent with the rotational direction and the rotational amount of the first object 70 from the reference posture, the processor 21 determines YES in step S400.

When it is determined that the change in the posture of the terrain object 50 is not consistent with the change in the posture of the first object 70 (step S400: NO), the processor 21 brings the change in the posture of the terrain object 50 closer to the change in the posture of the first object 70 (step S401). Here, the processor 21 changes the posture of the terrain object 50 so as to bring the posture of the terrain object 50 closer to the current posture of the first object 70. Specifically, the processor 21 rotates the terrain object 50 by the second angle smaller than the first angle so that the rotational direction and the rotational amount of the posture of terrain object 50 from its reference posture approach the rotational direction and the rotational amount of the posture of the first object 70 from its reference posture. For example, if the current posture of the first object 70 is rotated by a predetermined angle about the Y-axis from the reference posture, the processor 21 rotates the terrain object 50 by the second angle about the Y-axis so that the terrain object 50 is closer to the state of having rotated by the predetermined angle about the Y-axis from the reference posture. This second angle is smaller than the first angle by which the first object 70 is rotated in step S104. In other words, the terrain object 50 is rotated at a slower speed than the rotational speed at which the first object 70 is rotated by the above special ability of the player character PC.

If step S401 is performed, or if step S400 results in YES, the processor 21 determines whether the change in the position of the terrain object 50 is consistent with the change in the position of the first object 70 (step S402). In this step, the processor 21 determines whether the moving direction and the movement amount of the terrain object 50 from its reference position are consistent with the moving direction and the movement amount of the first object 70 from its reference position. If the moving direction and the movement amount of the terrain object 50 from its reference position are consistent with the moving direction and the movement amount of the first object 70 from its reference position, the processor 21 determines YES in step S402.

When it is determined that the change in the position of the terrain object 50 is not consistent with the change in the position of the first object 70 (step S402: NO), the processor 21 brings the change in the position of the terrain object 50 closer to the change in the position of the first object 70 (step S403). Here, the processor 21 moves the terrain object 50 by a second movement amount smaller than the first movement amount so that the moving direction and the movement amount of the terrain object 50 from its reference position approach to the moving direction and the movement amount of the first object 70 from its reference position. For example, in a state where the current position of the first object 70 is moving a predetermined movement amount in the X-axis direction from the reference position, the processor 21 moves the terrain object 50 by a second movement amount in the X-axis direction so that the state of the terrain object 50 approaches to the state of moving the predetermined movement amount in the X-axis direction from the reference position. This second movement amount is a movement amount that is smaller than the first movement amount by which the first object 70 moves in step S104. In other words, the terrain object 50 is moved at a slower speed than the moving speed at which the first object 70 is moved by the above special ability of the player character PC.

The terrain object 50 may be fixed to a predetermined position in the virtual space. In this case, steps S402 and S403 may not be performed.

If step S403 is executed, or if step S402 results in YES, the processor 21 terminates the process shown in FIG. 23 and returns to FIG. 20.

Returning to FIG. 20, the processor 21 performs the drawing process (step S109) after step S108. Specifically, the processor 21 generates an image of the virtual space taken from the virtual camera VC and displays the image on the display device. In this step, a game image based on the results of step S101 to S108 is generated and displayed on the display device.

Subsequently, the processor 81 determines whether to terminate the game processing (step S110). For example, when termination of the game is instructed by the player, the processor 21 determines YES in step S110 and terminates the game processing shown in FIG. 20. If step S110 results in NO, the processor 21 repeats the processing from step S101. This is the end of the description of FIG. 20.

Note that the processing of the above-described flowchart is no more than an example, and the sequence, the contents, and the like of the processing may be suitably modified.

As described above, in the present exemplary embodiment, a plurality of operable objects (70, 80) are arranged in the virtual space, and control is performed including rotation of any of the plurality of operable objects as an operation target, according to operation input based on an operation by the player (steps S104, S106). For example, when the first object 70 is selected as the operation target among the plurality of operable objects, the first object 70 is rotated according to a predetermined operation input. With the rotation of the first object 70, the terrain object 50 (a second object) corresponding to the first object 70 is rotated (step S108).

Thus, by changing at least the posture of the first object 70, the posture of the terrain object 50 can be changed. By arranging the first object 70 for operating the terrain object 50 in the virtual space, it is possible to operate even a large terrain object that is difficult to directly operate. At a time of operating the terrain object, a conceivable approach is to prepare a dedicated screen for operating the terrain object and make a transition to this dedicated screen to operate (change) the terrain. However, the present exemplary embodiment allows operation of the terrain object 50, without such a dedicated screen, simply by arranging the first object 70 in the virtual space and linking it with terrain objects 50. In other words, a function of controlling the terrain object 50 can be achieved with a simple configuration.

In the present exemplary embodiment, the terrain object 50 is rotated at a predetermined rotational speed so that the rotational direction and the rotational amount of the posture of the terrain object 50 from its reference posture approach the rotational direction and the rotational amount of the posture of the first object 70 from its reference posture. This way, for example, the terrain object 50 is slowly rotated even if the rotational speed of the first object 70 is relatively high, allowing the player to change the posture of the terrain object 50 to a desirable posture. For example, if the rotational speed of the terrain object 50 is high, objects on the terrain object 50 may be shaken off. This, however, is avoidable by reducing the rotational speed of the terrain object 50.

Further, the present exemplary embodiment deals with a case where a virtual object 80 out of the plurality of operable objects can be selected as the operation target, and the operation target can be rotated or moved (step S106). Further, the virtual object 80 as the operation target can be coupled with another object (step S305). There is virtual gravity in the virtual space, and the virtual object 80 makes a motion under the effect of the virtual gravity. The virtual object 80 includes a rock object 80*a* and a thrust object 80*b* that generates thrust. When the rock object 80*a* is coupled with the first object 70, the first object 70 makes a motion under the effect of the virtual gravity affecting the rock object 80*a*. The motion of the first object under the effect of this gravity also changes the posture of the terrain object 50. Further, when the thrust object 80*b* is coupled with the first object 70, the first object 70 makes a motion based on the thrust given by the thrust object 80*b*. The motion of the first object based on this thrust also changes the posture of the terrain object 50.

Thus, in the present exemplary embodiment, at least the posture of the first object 70 can be changed and at least the posture of the terrain object 50 can be changed, by coupling the first object 70 with another virtual object 80. This way, the posture of the terrain object 50 can be changed without a need for operating the first object 70 as the direct operation target.

Further, in the present exemplary embodiment, the player character PC can board the first object 70. When the player character PC is on the first object 70, the posture of the first object 70 changes based on the gravity affecting the player character PC. This allows the posture of the terrain object 50 to change.

Further, in the present exemplary embodiment, the first object 70 is floating in the air in the virtual space, despite the virtual gravity in the virtual space. Therefore, the player can perform the rotation operation while confirming the posture of the first object 70, making the rotation operation easier.

Further, in the present exemplary embodiment, the position of the first object 70 is fixed in the virtual space, or the movement range of the first object 70 in the virtual space is restricted. This allows easier operation of the first object 70 and easier control of the posture of the terrain object 50. Further, it is also possible to avoid an excessively significant change in the terrain of the virtual space, due to a movement of the terrain object 50 caused by the movement of the first object 70.

The present exemplary embodiment deals with a case where the first object 70 is not selectable as the selection target and the operation of the first object 70 is disabled, while the player character PC is positioned on the terrain object 50. This way, it is possible to avoid a situation where the player character PC falls from the terrain object 50 or is shaken off the terrain object 50.

Modification

An exemplary embodiment is thus described hereinabove. It should be noted that the above-described exemplary embodiment is no more than an example, and for example, various modifications as described below are possible.

For example, the above exemplary embodiment deals with a case where the position of the terrain object 50 is fixed or the movement of the terrain object 50 is restricted, by fixing the position of the first object 70, or restricting the movement of the first object 70. In another exemplary embodiment, the first object 70 may be configured to be movable to any given position. In this case, the terrain object 50 can also be moved to any given position.

In another embodiment, the terrain object 50 may be fixed at the reference position while the first object 70 can be moved from the reference position to any given position or within a predetermined movement range.

Further, the above exemplary embodiment deals with a case where the first object 70 out of the operable objects in the virtual space is selected as the operation target by the selection operation by the player, and the first object 70 is rotated when the rotation operation is performed while the first object 70 is selected. The operations using the controller described above are merely examples, and any operation may be used to control (rotate and/or move) the first object 70 and control the terrain objects 50. For example, the selection operation and the rotation operation may be performed simultaneously.

Further, the above exemplary embodiment deals with a case where the first object 70 is not selectable as the operation target, while the player character PC is positioned on the terrain object 50. Another method may be possible to restrict the operations of the first object 70 while the player character PC is positioned on the terrain object 50. For example, it is possible to enable selection of the first object 70 as the operation target but operations of the first object 70 are restricted or disabled, while the player character PC is positioned on the terrain object 50. Further, when the player character PC is positioned on the terrain object 50, the first object 70 can be operated, but the operation range may be restricted. For example, when the player character PC is positioned on the terrain object 50, it may be possible to change the posture of the first object 70 only within a predetermined range. In this case, the posture of the terrain object 50 can also be changed only within the predetermined range.

Further, in another exemplary embodiment, operations on the first object 70 may not be restricted even while the player character PC is positioned on the terrain object 50.

Further, the above exemplary embodiment deals with a case where the rotational direction and the rotational amount of the terrain object 50 are controlled so that the rotational direction and the rotational amount of the posture of terrain object 50 from its reference posture approach the rotational direction and the rotational amount of the posture of the first object 70 from its reference posture. In another exemplary embodiment, the posture of the terrain object 50 may be changed so as to be always consistent with the change in the posture of the first object 70. In other words, the speed of change in the posture of the first object 70 and the speed of change in the posture of the terrain object 50 may be the same. The same applies to the changes in the positions. In other words, the position of the terrain object 50 may be changed so as to be always consistent with the change in the position of the first object 70.

The configuration of hardware for performing the above game is merely an example. Alternatively, the above game processing may be performed by any other piece of hardware. For example, the above game processing may be executed in any information processing system such as a personal computer, a tablet terminal, a smartphone, or a server on the Internet. The above game processing may be executed in a dispersed manner by a plurality of apparatuses.

The configurations of the above exemplary embodiment and its modifications can be optionally combined together unless they contradict each other. Further, the above description is merely an example of the exemplary embodiment, and may be improved and modified in various manners other than the above.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. A non-transitory computer-readable storage medium having stored therein a game program, wherein the game program causes a computer of an information processing apparatus to:

perform a first control of a player character in a virtual space according to an operation input based on a first operation, the first control including at least a movement of the player character on a terrain object in the virtual space;

according to an operation input based on a second operation, perform a second control for an operation target that is an operable object out of a plurality of operable objects to be a target of the second operation among a plurality of objects within the virtual space, the second control including at least rotation of the operation target within the virtual space;

rotate a second object that is the terrain object, according to a change in a posture of a first object that is the operable object, within the virtual space; and cause at least one object out of the operable objects to make a motion under an effect of virtual gravity, while the second control is not performed, the first object is maintained in a state of floating in the air in the virtual space irrespective of the virtual gravity.

2. The non-transitory computer-readable storage medium of claim 1 having stored therein the game program, wherein the game program causes the computer to perform, as the second control, at least a control of rotating an object set as the operation target about a predetermined axis and a control of moving the object set as the operation target in an instructed direction.

3. The non-transitory computer-readable storage medium of claim 2 having stored therein the game program, wherein the game program causes the computer to perform, further as the second control, a control of coupling the object set as the operation target with another object.

4. The non-transitory computer-readable storage medium of claim 3 having stored therein the game program, wherein:

the operable object comprises a thrust object that generates virtual thrust; and the game program further causes the computer to cause at least one object out of the operable objects to make a motion based on the virtual thrust, while the second control is not performed, and when the thrust object is coupled with the first object, cause the first object coupled with the thrust object to make a motion based on the virtual thrust given by the thrust object.

5. The non-transitory computer-readable storage medium of claim 3 having stored therein the game program, wherein the game program further causes the computer to:

when a third object that is an operable object different from the first object is coupled with the first object, cause the first object coupled with the third object to make a motion under the effect of the virtual gravity.

6. The non-transitory computer-readable storage medium of claim 5 having stored therein the game program, wherein a position of the first object is fixed within the virtual space or a movement range of the first object is restricted within the virtual space.

7. The non-transitory computer-readable storage medium of claim 6 having stored therein the game program, wherein the game program causes the computer to:

cause the player character to fall based on virtual gravity and, cause the first object to make a motion based on the virtual gravity affecting the player character while the player character is on the first object.

8. The non-transitory computer-readable storage medium of claim 1 having stored therein the game program, wherein the game program further causes the computer to restrict the second control for the first object while the player character is on the second object.

9. The non-transitory computer-readable storage medium of claim 1 having stored therein the game program, wherein the game program causes the computer to, as the second control, rotate the second object at a predetermined rotational speed so that a rotational direction and a rotational amount of the posture of the second object relative to its reference posture approach to a rotational direction and a rotational amount of the posture of the first object relative to its reference posture.

10. An information processing system comprising at least one processor, the at least one processor being configured to:

perform a first control of a player character in a virtual space according to an operation input based on a first operation, the first control including at least a movement of the player character on a terrain object in the virtual space;

according to an operation input based on a second operation, perform a second control for an operation target that is an operable object out of a plurality of operable objects to be a target of the second operation among a plurality of objects within the virtual space, the second control including at least rotation of the operation target within the virtual space; and rotate a second object that is the terrain object, according to a change in a posture of a first object that is the operable object, within the virtual space; and cause at least one object out of the operable objects to make a motion under an effect of virtual gravity, while the second control is not performed, wherein the first object is maintained in a state of floating in the air in the virtual space irrespective of the virtual gravity.

11. The information processing system of claim 10, wherein the at least one processor is configured to perform, as the second control, at least a control of rotating an object set as the operation target about a predetermined axis and a control of moving the object set as the operation target in an instructed direction.

12. The information processing system of claim 11, wherein the at least one processor is configured to perform, further as the second control, a control of coupling the object set as the operation target with another object.

13. The information processing system of claim 12, wherein:

the operable object comprises a thrust object that generates virtual thrust; and the at least one processor is configured to cause at least one object out of the operable objects to make a motion based on the virtual thrust, while the second control is not performed, and when the thrust object is coupled with the first object, cause the first object coupled with the thrust object to make a motion based on the virtual thrust given by the thrust object.

14. The information processing system of claim 12, wherein the at least one processor is configured to:

when a third object that is an operable object different from the first object is coupled with the first object, cause the first object coupled with the third object to make a motion under the effect of the virtual gravity.

15. The information processing system of claim 14, wherein a position of the first object is fixed within the virtual space or a movement range of the first object is restricted within the virtual space.

16. The information processing system of claim 11, wherein the at least one processor is configured to:

cause the player character to fall based on virtual gravity and; and cause the first object to make a motion based on the virtual gravity affecting the player character while the player character is on the first object.

17. The information processing system of claim 10, wherein the at least one processor is configured to restrict the second control for the first object while the player character is on the second object.

18. The information processing system of claim 10, wherein the at least one processor is configured to, as the second control, rotate the second object at a predetermined rotational speed so that a rotational direction and a rotational amount of the posture of the second object relative to its reference posture approach to a rotational direction and a rotational amount of the posture of the first object relative to its reference posture.

19. An information processing apparatus comprising at least one processor, the at least one processor being configured to:

perform a first control of a player character in a virtual space according to an operation input based on a first operation, the first control including at least a movement of the player character on a terrain object in the virtual space, according to an operation input based on a second operation, perform a second control for an operation target that is an operable object out of a plurality of operable objects to be a target of the second operation among a plurality of objects within the virtual space, the second control including at least rotation of the operation target within the virtual space; and rotate a second object that is the terrain object, according to a change in a posture of a first object that is the operable object, within the virtual space; and cause at least one object out of the operable objects to make a motion under an effect of virtual gravity, while the second control is not performed, wherein the first object is maintained in a state of floating in the air in the virtual space irrespective of the virtual gravity.

20. The information processing apparatus of claim 19, wherein the at least one processor is configured to perform, as the second control, at least a control of rotating an object set as the operation target about a predetermined axis and a control of moving the object set as the operation target in an instructed direction.

21. The information processing apparatus of claim 19, wherein the at least one processor is configured to, as the second control, rotate the second object at a predetermined rotational speed so that a rotational direction and a rotational amount of the posture of the second object relative to its reference posture approach to a rotational direction and a rotational amount of the posture of the first object relative to its reference posture.

22. An information processing method executable in an information processing system, the method comprising:

performing a first control of a player character in a virtual space according to an operation input based on a first operation, the first control including at least a movement of the player character on a terrain object in the virtual space;

according to an operation input based on a second operation, performing a second control for an operation target that is an operable object out of a plurality of operable objects to be a target of the second operation among a plurality of objects within the virtual space, the second control including at least rotation of the operation target within the virtual space; and rotating a second object that is the terrain object, according to a change in a posture of a first object that is the operable object, within the virtual space; and causing at least one object out of the operable objects to make a motion under an effect of virtual gravity, while the second control is not performed, wherein the first object is maintained in a state of floating in the air in the virtual space irrespective of the virtual gravity.

23. The information processing method of claim 22, wherein the second control includes at least a control of rotating an object set as the operation target about a predetermined axis and a control of moving the object set as the operation target in an instructed direction.

24. The information processing method of claim 22, wherein, as the second control, the second object is rotated at a predetermined rotational speed so that a rotational direction and a rotational amount of the posture of the second object relative to its reference posture approach to a rotational direction and a rotational amount of the posture of the first object relative to its reference posture.

* * * * *